United States Patent
Ham et al.

(10) Patent No.: US 9,727,157 B2
(45) Date of Patent: Aug. 8, 2017

(54) TOUCH SENSITIVE DEVICE PROVIDING A TACTILE FEEDBACK, DISPLAY DEVICE COMPRISING THE SAME AND METHOD OF DRIVING THE SAME

(71) Applicant: LG DISPLAY CO., LTD., Seoul (KR)

(72) Inventors: Yong-Su Ham, Seoul (KR); SuSeok Choi, Seongnam-si (KR); Taeheon Kim, Seoul (KR); YongWoo Lee, Goyang-si (KR); MyungJin Lim, Goyang-si (KR); Seulgi Choi, Incheon (KR)

(73) Assignee: LG DISPLAY CO., LTD., Seoul (KR)

(*) Notice: Subject to any disclaimer, the term of this patent is extended or adjusted under 35 U.S.C. 154(b) by 11 days.

(21) Appl. No.: 14/970,154

(22) Filed: Dec. 15, 2015

(65) Prior Publication Data

US 2016/0179260 A1   Jun. 23, 2016

(30) Foreign Application Priority Data

Dec. 18, 2014   (KR) .................. 10-2014-0183046
Dec. 30, 2014   (KR) .................. 10-2014-0193709
Dec. 30, 2014   (KR) .................. 10-2014-0193740
Jun. 16, 2015   (KR) .................. 10-2015-0085231

(51) Int. Cl.
  *G06F 3/041*  (2006.01)
  *G06F 3/047*  (2006.01)
  *G06F 3/01*   (2006.01)

(52) U.S. Cl.
  CPC ............ *G06F 3/0412* (2013.01); *G06F 3/016* (2013.01); *G06F 3/047* (2013.01); *G06F 3/0416* (2013.01); *G06F 2203/04102* (2013.01); *G06F 2203/04107* (2013.01)

(58) Field of Classification Search
  CPC ........ G06F 3/0412; G06F 3/016; G06F 3/047; G06F 2203/04102; G06F 2203/04107
  USPC .......................................... 345/173
  See application file for complete search history.

(56) References Cited

U.S. PATENT DOCUMENTS

| 2009/0001855 A1 | 1/2009 | Lipton et al. |
| 2009/0167704 A1 | 7/2009 | Terlizzi et al. |
| 2012/0128960 A1 | 5/2012 | Büsgen et al. |
| 2012/0327004 A1 | 12/2012 | Mikladal et al. |

(Continued)

FOREIGN PATENT DOCUMENTS

| JP | 2010-532655 A | 10/2010 |
| JP | 2012-523809 A | 10/2012 |

(Continued)

*Primary Examiner* — Matthew Fry
*Assistant Examiner* — Lisa Landis
(74) *Attorney, Agent, or Firm* — Birch, Stewart, Kolasch & Birch, LLP

(57) ABSTRACT

A touch sensitive device, a display device including the touch sensitive device and a method of driving the same are discussed. The touch sensitive device can include an electroactive layer including an electroactive polymer; and one or more first electrodes and one or more second electrodes are disposed on only one surface of the electroactive layer, in which the first and the second electrodes include a conductive material. The first and the second electrodes of the touch sensitive device can be disposed only on one surface of the electroactive layer, a driving voltage of the touch sensitive device can be reduced and transmissivity can be improved.

18 Claims, 29 Drawing Sheets

(56) References Cited

U.S. PATENT DOCUMENTS

| | | | |
|---|---|---|---|
| 2013/0044049 A1* | 2/2013 | Biggs | G06F 3/016 345/156 |
| 2013/0057509 A1* | 3/2013 | Cruz-Hernandez | G06F 3/044 345/174 |
| 2013/0307789 A1* | 11/2013 | Karamath | G06F 3/016 345/173 |
| 2014/0049505 A1 | 2/2014 | Radivojevic et al. | |
| 2014/0085065 A1 | 3/2014 | Biggs et al. | |
| 2014/0104512 A1 | 4/2014 | Huang et al. | |
| 2014/0192005 A1 | 7/2014 | Wakuda et al. | |
| 2015/0316986 A1* | 11/2015 | Xue | G06F 3/041 345/173 |
| 2016/0004309 A1* | 1/2016 | Modarres | G06F 3/016 345/173 |
| 2016/0026298 A1* | 1/2016 | Hashida | G06F 1/16 345/174 |
| 2016/0041636 A1* | 2/2016 | Yun | G06F 3/044 349/12 |

FOREIGN PATENT DOCUMENTS

| | | | |
|---|---|---|---|
| JP | 2014-510346 A | | 4/2014 |
| JP | WO2015/005104 | * | 1/2015 |
| KR | WO2013032302 | * | 3/2013 |
| TW | 201203041 A1 | | 1/2012 |
| TW | 201416924 A | | 5/2014 |
| WO | WO 2014/002405 A1 | | 1/2014 |

\* cited by examiner

TOUCH SENSITIVE DEVICE PROVIDING A TACTILE FEEDBACK, DISPLAY DEVICE COMPRISING THE SAME AND METHOD OF DRIVING THE SAME

CROSS-REFERENCE TO RELATED APPLICATIONS

This application claims the priority of Korean Patent Application No. 10-2014-0183046 filed on Dec. 18, 2014, the priority of Korean Patent Application No. 10-2014-0193709 filed on Dec. 30, 2014, the priority of Korean Patent Application No. 10-2014-0193740 filed on Dec. 30, 2014 and the priority of Korean Patent Application No. 10-2015-0085231 filed on Jun. 16, 2015, all filed in the Republic of Korea. All these applications are incorporated herein by reference.

BACKGROUND OF THE INVENTION

Field of the Disclosure

The present disclosure relates to a touch sensitive device and a display device including the touch sensitive device, and more particularly, to a touch sensitive device made of an EAP (Electro Active Polymer) having a low driving voltage and high transmissivity and a display device including the touch sensitive device.

Description of the Related Art

A touch panel, a device sensing touch input by a user such as a touch on the screen of a display device or a gesture, is widely used in large display devices such as display devices in public facilities and a smart TV, including portable display devices such as a smartphone and a tablet PC. Touch panels are classified into a resistive type, a capacitive type, an ultrasonic type, an infrared type and so on.

However, there are not only studies on sensing touch input by a user being performed, but also studies on haptic devices delivering touch sense feedback, which a user can feel with fingers or a stylus pen, as feedback of touch input by a user.

As one example, a haptic device may use an ERM (Eccentric Rotating Mass) with a display device. The ERM is a vibration motor that generates mechanical vibration using eccentric force that is generated when a motor is operated by attaching a mass to a portion of the rotor of the motor. However, ERMs are made of an opaque material, so they should not be disposed on the front surface, but on the rear surface of the display panel in a display device. Further, since ERMs generate vibration by a motor, no specific portion of a display device vibrates, rather the entire display device vibrates. Accordingly, in a display device with the ERM, a problem occurs as touch sense feedback cannot be delivered only to the portion touched by a user. Further, since ERMs generate mechanical vibration through a motor, the response speed is low, and thus, they are difficult to be used as a vibration source in haptic devices.

Further, as another example of a haptic device, there is a haptic device using a LRA (Linear Resonant Actuator) with a display device. LRAs deliver touch sense feedback through vibration of a spring and a stainless oscillator that is generated by reciprocation of a permanent magnet in a solenoid. However, similar to ERMs, LRAs are also made of an opaque material and vibrate an entire display device, so LRAs have the same problem as ERMs. Further, LRAs should use a resonance frequency, so the resonance frequency is fixed between 150 Hz to 200 Hz. Accordingly, haptic devices equipped with an LRA have difficulty in generating various vibrations.

Haptic devices equipped with a piezo ceramic actuator have been used to solve these problems. Piezo ceramic actuators have a high response speed of several micro seconds and a large range of vibration frequency, so they can achieve vibrations within all frequency ranges that people can actually feel. However, piezo ceramic actuators are formed in the shape of a ceramic plate, causing them to be easily broken by an external shock due to low durability against an external shock. Further, piezo ceramic actuators have a problem that they are opaque like ERMs and LRAs, and are difficult to be made thin. Also, piezo ceramic actuators vibrate an entire display device as they are disposed on the rear surface of the display device.

SUMMARY OF THE INVENTION

The inventors have considered that a touch sensitive device made of an electroactive polymer can be used as a vibration source for generating vibration in a haptic device. In more detail, the touch sensitive device made of the electroactive polymer can deliver touch sense feedback to a user, using vibration of the electroactive layer, which is generated by applying a voltage to electrodes disposed on and under the electroactive layer made of an electroactive polymer. The touch sensitive device can be made of transparent materials, so it can be disposed on the front surface of a display device.

However, the driving voltage of the touch sensitive device made of the electroactive polymer is very high, several kilovolts, in comparison to the conventional vibration sources as described above. Accordingly, there is a need for an additional boosting circuit for increasing a voltage from a power used in the display device, but it is difficult to make boosting circuits small such that they can be used for personal portable display devices such as a smartphone and a tablet PC. Accordingly, there is a method of reducing the thickness of an electroactive layer to decrease a driving voltage, but when the electroactive layer decreases in thickness, displacement of the electroactive layer is suppressed by the weight of an object to be vibrated by a touch sensitive device, that is, the weight of a display device, so vibration is very weak or not generated.

Further, even if the components of a touch sensitive device are made of transparent materials, as electrodes are disposed on and under an electroactive layer, transmissivity decreases.

Accordingly, the inventors have considered problems of existing haptic devices and a driving voltage and problems of transmissivity caused by a touch sensitive device made of an electroactive polymer. They have designed a new type of touch sensitive device capable of solving those problems, a method of driving the touch sensitive device, and a display device including the touch sensitive device.

Accordingly, an object of the present disclosure is to provide a touch sensitive device of which transmissivity can be maximized by forming electrodes for applying a voltage to an electroactive layer, on a surface of the electroactive layer and a display device including the touch sensitive device.

Another object of the present disclosure is to provide a touch sensitive device that can be driven even with a low driving voltage by minimizing the gaps among electrodes for applying a voltage to an electroactive layer and a display device including the touch sensitive device.

Another object of the present disclosure is to provide a touch sensitive device that can deliver various touch sense feedbacks to a user by varying the gaps among electrodes for applying a voltage to an electroactive layer and by applying a voltage having frequencies according to the electrode gaps and a display device including the touch sensitive device.

Another object of the present disclosure is to provide a method of driving a touch sensitive device that can achieve textures of different materials and sense of touch generated by vibration in one structure by disposing a plurality of electrodes on one surface of an electroactive layer and applying voltages different from each other to the respective electrodes.

It should be noted that objects of the present disclosure are not limited to the above-mentioned objects and other objects of the present disclosure will be apparent to those skilled in the art from the following descriptions.

According to an aspect of the present disclosure to achieve the above-described objects, there is provided a touch sensitive device that includes an electroactive layer including an electroactive polymer; and one or more first electrodes and one or more second electrodes disposed on only one surface of the electroactive layer, in which the first and the second electrodes include a conductive material. The electroactive layer may include a plurality of cells, and the first and the second electrodes may be disposed in each of the cells. The first electrode may have a portion spaced by a first gap from the second electrode disposed in the same cell and a portion spaced by a second gap from the second electrode. Each of the first and the second electrodes may have a first sub-electrode and a plurality of second sub-electrodes extending from the first sub-electrode, and the plurality of second sub-electrodes of the first electrode and the plurality of second sub-electrodes of the second electrode may be alternately disposed. The first and the second electrodes disposed in a first cell of the cells may be spaced by a first gap, and the first and the second electrodes disposed in a second cell of the cells may be spaced by a second gap. The gap between the first and the second electrodes may be smaller than the thickness of the electroactive layer. Each of the first electrode and the second electrodes each may have a spiral structure or a double loop structure. The first and the second electrodes may include a transparent conductive material. If a voltage is applied to the first and second electrodes, the electroactive layer may vibrate due to an electric field generated on the electroactive layer.

According to another aspect of the present disclosure to achieve the above-described objects, there is provided a touch sensitive device that includes one or more first electrodes disposed in a plurality of cells on a surface of an electroactive layer including an electroactive polymer and including a conductive material, wherein a first voltage is applied to the first electrode; and one or more second electrodes disposed in the cells on the surface of the electroactive layer including an electroactive polymer and including a conductive material, wherein a second voltage is applied to the second electrode, in which the first voltage and the second voltage have frequencies corresponding to a resonance frequency according to the gap between the first and the second electrodes. The first voltage having the resonance frequency may be applied to the first electrodes, and the second electrodes may be grounded. The first electrode may have a portion spaced apart from the second electrode by a first gap disposed in the same cell and a portion spaced apart from the second electrode by a second gap. The first voltage having a resonance frequency corresponding to the first gap or a resonance frequency corresponding to the second gap may be applied to the first electrode, and the second electrode may be grounded. The first and the second electrodes disposed in a first cell of the cells may be spaced by a first gap, the first and the second electrodes disposed in a second cell of the cells may be spaced by a second gap. The first voltage having a resonance frequency corresponding to the first gap may be applied to the first electrode disposed in the first cell or the first voltage having a resonance frequency corresponding to the second gap may be applied to the first electrode disposed in the second cell. Further, the second electrode disposed in the first cell or the second electrode disposed in the second cell may be grounded.

According to another aspect of the present disclosure, there is provided a display device that includes: a touch panel; a touch sensitive device including an electroactive layer disposed on or under the touch panel and including an electroactive polymer and one or more first electrodes and one or more second electrodes disposed on only one surface of the electroactive layer; and a cover disposed over the touch panel and the touch sensitive device, in which the first and the second electrodes include a conductive material. The display device may further include a display panel, and the first and the second electrodes may face the display panel. The display device may further include a display panel having the touch panel therein, in which the display panel may be disposed between the cover and the touch sensitive device or under the touch sensitive device. The area of cells of the touch sensitive device and the area of pixels of the touch panel may be the same.

According to another aspect of the present disclosure, there is provided a method of driving a touch sensitive device according to an aspect of the present disclosure. In the method of driving a touch sensitive device, a touch sensitive device including an electroactive layer including an electroactive polymer, first electrodes disposed on only one surface of the electroactive layer, and second electrodes disposed adjacent to the first electrodes are provided. Different voltages are applied to the first electrodes and the second electrodes so that the touch sensitive device vibrates, and the same voltage is applied to all of the first electrodes and the second electrodes to generate horizontal friction on the touch sensitive device, for changing from the vibration.

The horizontal friction may be generated by planar movement of a finger on the touch sensitive device.

The applying of different voltages to the first electrodes and the second electrodes or the applying of the same voltage to all of the first electrodes and the second electrodes may be performed only on a partial area of the touch sensitive device.

The details of other embodiments are included in the following detailed description and the accompanying drawings.

According to embodiments the present disclosure, since the first electrodes and the second electrodes are formed on the same surface of the electroactive layer, transmissivity of the touch sensitive device made of an electroactive polymer can be improved.

Further, according to the present disclosure, it is possible to reduce a driving voltage of the touch sensitive device by disposing the first electrodes and the second electrodes on the same surface of the electroactive layer, as compared with a case wherein first electrodes and second electrodes are disposed on different surfaces of an electroactive layer.

Further, according to the present disclosure, it is possible to deliver various touch sense feedbacks to a user by adjusting the gap between the first electrode and the second electrode.

Further, according to the present disclosure, since vibrations and textures of materials are achieved by an integrated structure with two different driving methods, it is possible to provide realistic senses such as more detailed textures and dynamic input feedback.

The effects of the present disclosure are not limited to the aforementioned effects, and other various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENTS

Figure 1A:
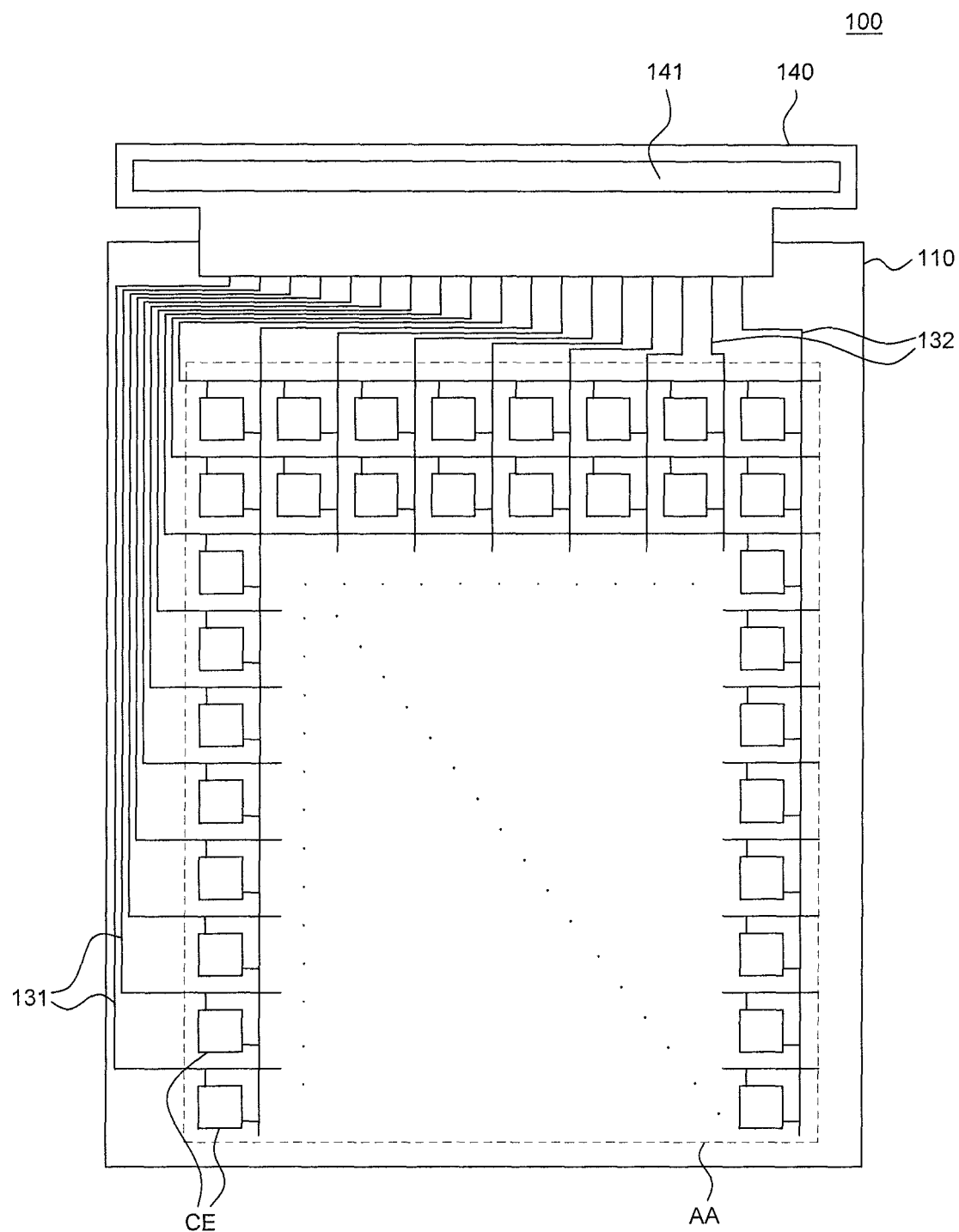
FIG. 1A is a schematic plan view illustrating a touch sensitive device according to an embodiment of the present disclosure.

Advantages and features of the present disclosure and methods for achieving them will become apparent from the descriptions of embodiments herein below with reference to the accompanying drawings. However, the present disclosure is not limited to embodiments disclosed herein but may be implemented in various different forms. The embodiments are provided for making the disclosure of the present disclosure thorough and for fully conveying the scope of the present disclosure to those skilled in the art. It is to be noted that the scope of the present disclosure is defined only by the claims.

The shapes, sizes, ratios, angles, numbers, and the like illustrated in the accompanying drawings illustrating the embodiments of the present disclosure are merely examples, and the present disclosure is not limited thereto. Like reference numerals denote like elements throughout the descriptions. However, in describing the present disclosure, detailed descriptions of well-known technologies will be omitted so as not to obscure the description of the present disclosure with unnecessary detail. In the cases using terms "include," "have," and "composed of" state herein, other components may be added unless a term "only" is used. Any references to singular may include plural unless expressly stated otherwise.

In analyzing components, it should be construed as including a tolerance range even if not specifically stated.

When positional relationships are described, for example, positional relationship between two parts such as "on," "over," "under," and "side," one or more other parts may be positioned between the two parts unless "right" or "directly" is used.

As used herein, a phrase "an element A on an element B" refers to that the element A may be disposed directly on the element B and/or the element A may be disposed indirectly on the element B via another element C.

Terms such as first, and second, are used to distinguish arbitrarily between the elements such terms describe and these terms are not necessarily intended to indicate temporal or other prioritization of such elements. These terms are merely used for distinguishing one component from the other components. Therefore, a first component to be mentioned below may be a second component in a technical concept of the present disclosure.

Like reference numerals denote like elements throughout the descriptions.

The drawings are not to scale and the relative dimensions of various elements in the drawings are depicted schematically and not necessarily to scale.

Features of various embodiments of the present disclosure may be coupled or combined partially or totally. As will be easily appreciated by those skilled in the art, technically various interactions and operations are possible. Various embodiments can be practiced individually or in combination.

The electroactive layer of the present disclosure is a layer that can provide vibration by changing its shape as voltage is applied therein.

The touch sensitive device of the present disclosure is a device that can provide a sense of touch to a user corresponding to the user's touch on the touch sensitive device.

Hereinafter, various embodiments of the present disclosure are described in detail with reference to the accompanying drawings.

FIG. 1A is a schematic plan view illustrating a touch sensitive device according to an embodiment of the present disclosure. Referring to FIG. 1A, a touch sensitive device 100 comprises an electroactive layer 110, cells CE, a first electrode 120 and a second electrode 160 disposed in the cell CE, first wires 131, second wires 132, and an FPCB 140.

The electroactive layer 110 is a plate-shaped film made of an electroactive polymer deformed by electric stimulation. For example, the electroactive layer 110 may be made of a dielectric elastomer based on silicon, urethane, and acryl, a ferroelectric polymer such as PVDF or P(VDF-TrFE), or piezo ceramic element. When the electroactive layer 110 is made of a dielectric elastomer, the dielectric elastomer is contracted and expanded by coulombic force generated by a voltage applied to the electroactive layer 110, so the touch sensitive device 100 can vibrate. When the electroactive layer 110 is made of a ferroelectric polymer and a voltage is applied to the electroactive layer 110, the arrangement direction of dipoles in the electroactive layer 110 changes, so the touch sensitive device 100 can vibrate.

The electroactive layer 110 is configured to have an active area AA. The active area AA of the electroactive layer 110, which is an area for delivering touch sense feedback to a user, includes a plurality of cells CE where the first electrode 120 and the second electrode 160 are disposed. In this instance, the cells CE are minimum units capable of delivering touch sense feedback to a user and can individually deliver touch sense feedback.

The areas of the cells CE of the electroactive layer 110 may be determined by considering sizes of the fingers of normal people. The touch sensitive device 100 delivers touch sense feedback in response to touch input by a user and the cells CE that are minimum unit areas capable of touch sense feedback to a user may be determined by considering the area that a user touches. In this instance, the area that a user touches depends on the sizes of the fingers of normal people, so the areas of the cells CE of the electroactive layer 100 can also be determined by considering the sizes of the fingers of normal people.

In some embodiments, the areas of the cells CE of the electroactive layer 110 may depend on the areas of pixels of a touch panel that can be used with the electroactive layer 110. The touch sensitive device 100 delivers touch sense feedback to a user in response to sensing touch input by a user. Accordingly, for example, when the cells CE of the touch sensitive device 100 have the same area as the pixels of a touch panel through which touch input by a user is sensed, the pixels of the touch panel and the cells CE of the touch sensitive device 100 can have one-to-one correspondence, so the touch sensitive device 100 can be more easily driven.

Figure 1B:
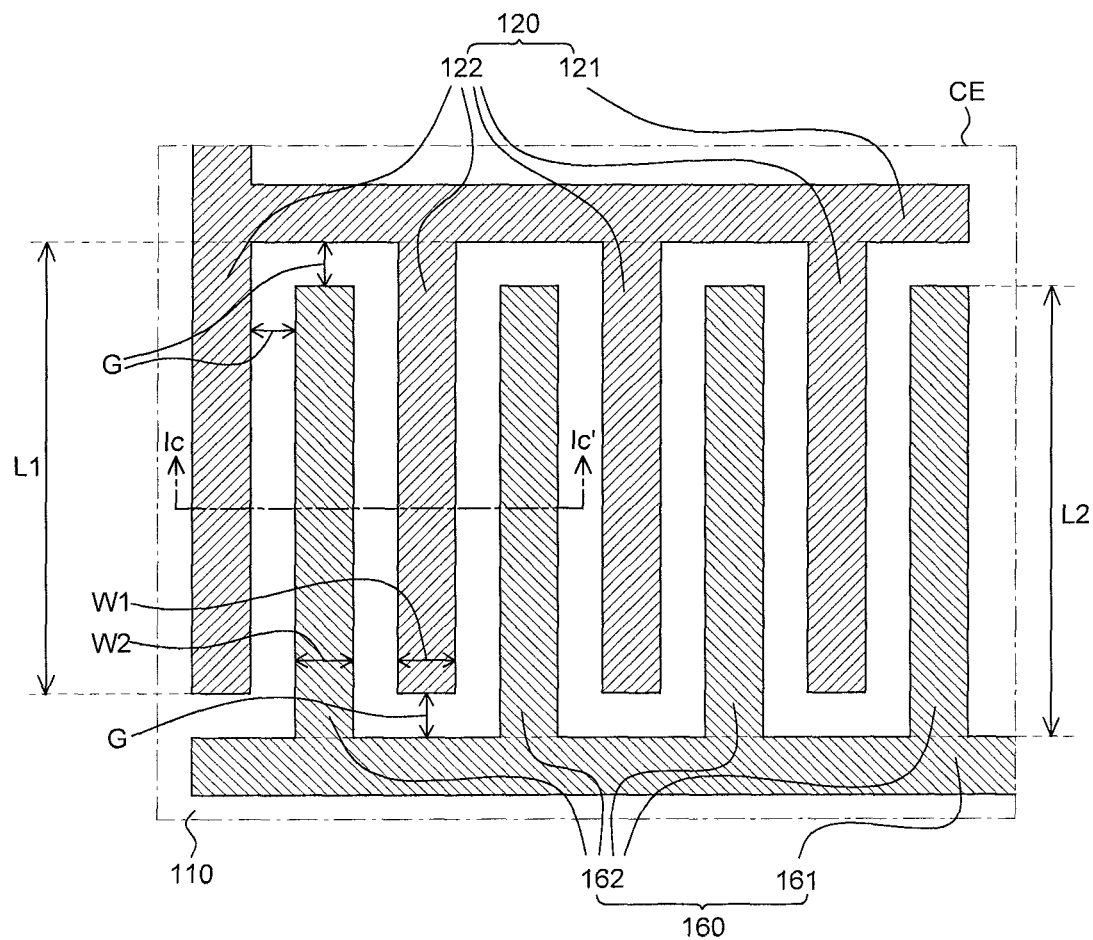
FIG. 1B is a schematic enlarged plan view illustrating a cell of the touch sensitive device according to an embodiment of the present disclosure.
Figure 1C:
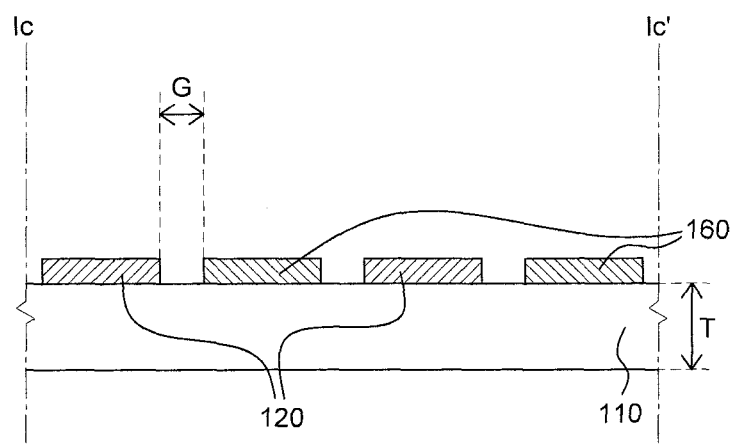
FIG. 1C is a schematic cross-sectional view of the touch sensitive device taken along line Ic-Ic' in FIG. 1B.

The following description refers to FIGS. 1B and 1C for more detailed description of the cell CE and the first electrode 120 and the second electrode 160 disposed in the cell CE.

FIG. 1B is a schematic enlarged plan view illustrating a cell of the touch sensitive device according to an embodiment of the present disclosure. FIG. 1C is a schematic cross-sectional view of the touch sensitive device taken along line Ic-Ic' in FIG. 1B. FIG. 1B illustrates only one of the cells CE of the touch sensitive device 100 and all of the cells CE of the touch sensitive device 100 can be configured in the same way as the cell CE illustrated in FIG. 1B.

The first electrode 120 and the second electrode 160, which are electrodes for applying a voltage to the electroactive layer 110, are made of a conductive material. Further, the first electrode 120 and the second electrode 160 may be made of a transparent conductive material to secure transmissivity of the touch sensitive device 100. For example, the first electrode 120 and the second electrode 160 may be made of a transparent conducive material such as ITO (Indium Tin Oxide), PEDOT:PSS, and a nano silver wire (AgNW). Further, the first electrode 120 and the second electrode 160 may be metal meshes. That is, the first electrode 120 and the second electrode 160 can be metal meshes, which are made of metal in a mesh shape, and can actually function as transparent electrodes. However, the materials of the first electrode 120 and the second electrode 160 are not limited thereto and various transparent conductive materials may be used as the materials of the first electrode 120 and the second electrode 160. The first electrode 120 and the second electrode 160 may be made of the same material or different materials.

Referring to FIGS. 1B and 1C, the first electrode 120 and the second electrode 160 are disposed on only one surface of the electroactive layer 110 in one cell CE. That is, the first electrode 120 and the second electrode 160 are disposed on the same surface of the electroactive layer 100 and both are disposed in one cell CE. For example, the first electrode 120 and the second electrode 160 may be formed not on the bottom surface, but only on the top surface of the electroactive layer 110 (e.g., the side closest to the user).

Even though the first electrode 120 and the second electrode 160 are made of a transparent conductive material, some of light traveling into the first electrode 120 and the second electrode 160 may be reflected or absorbed. Accordingly, if light travels into the first electrode 120 and the second electrode 160 but cannot pass through them, transmissivity of the touch sensitive device 100 may be deteriorated by the first electrode 120 and the second electrode 160. Accordingly, in the touch sensitive device 100 according to an embodiment of the present disclosure, the first electrode 120 and the second electrode 160 made of a transparent conductive material are disposed on one surface of the electroactive layer 110. Therefore, the number of electrodes through which light should pass through in the touch sensitive device 100 decreases, so transmissivity of the touch sensitive device 100 can be improved, as compared with the situation wherein the first electrode 120 and the second electrode 160 are disposed on different surfaces of the electroactive layer 110 (e.g., light would need to pass through both the first electrode 120 and second electrode 160). Effects associated with transmissivity of the touch sensitive device 100 according to an embodiment of the present disclosure will be described in detail below with reference to FIG. 2.

The first electrode 120 and the second electrode 160 may be formed on one surface of the electroactive layer 110 in various ways. The first electrode 120 and the second electrode 160 may be formed on the top surface of the electroactive layer 110, for example, by sputtering, printing, and slit coating. In particular, when the first electrode 120 and the second electrode 160 are made of the same material, they may be simultaneously formed.

Referring to FIG. 1C, the gap G between the first electrode 120 and the second electrode 160 is smaller than the thickness T of the electroactive layer 110. When a voltage is applied to the first electrode 120 and the second electrode 160, an electric field generated between the first electrode 120 and the second electrode 160 is inversely proportional to the distance therebetween (e.g., the closer the electrodes, the stronger electric field). That is, when the potential difference between the first electrode 120 and the second electrode 160, that is, the driving voltages are the same, as the distance between the first electrode 120 and the second electrode 160 increases, the electric field between the first electrode 120 and the second electrode 160 decreases. However, as the distance between the first electrode 120 and the second electrode 160 decreases, the electric field between the first electrode 120 and the second electrode 160 increases. Accordingly, in the touch sensitive device 100 according to an embodiment of the present disclosure, it is possible to increase the magnitude of the electric field applied to the electroactive layer 110 when the same driving voltage is applied, as compared with a touch sensitive device in which one electrode is disposed on the top surface of an electroactive layer and one electrode is disposed on the bottom surface of the electroactive layer, by making the gap G between the first electrode 120 and the second electrode 160 smaller than the thickness T of the electroactive layer 110. Further, in the touch sensitive device 100 according to an embodiment of the present disclosure, the driving voltage for achieving an electric field having the same magnitude can be reduced, as compared with a touch sensitive device in which one electrode is disposed on the top surface of an electroactive layer 110 and one electrode is disposed on the bottom surface of the electroactive layer 110, by making the gap G between the first electrode 120 and the second electrode 160 smaller than the thickness T of the electroactive layer 110. Effects associated with the driving voltage of the touch sensitive device 100 according to an embodiment of the present disclosure will be described in detail below with reference to FIG. 3.

Referring to FIG. 1B, the first electrode 120 and the second electrode 160 are composed of first sub-electrodes 121 and 161 and a plurality of second sub-electrodes 122 and 162 extending from the first sub-electrodes 121 and 161, respectively. In more detail, the first electrode 120 has a first sub-electrode 121 extending transversely in the upper region of the cell CE and a plurality of second sub-electrodes 122 extending longitudinally from the first sub-electrode 121. Further, the second electrode 160 has a first sub-electrode 161 extending transversely in the lower region of the cell CE and a plurality of second sub-electrodes 162 extending longitudinally from the first sub-electrode 161. Accordingly, the first sub-electrode 121 of the first electrode 120 and the first sub-electrode 161 of the second electrode 160 may be referred to as stem electrodes, while the second sub-electrode 122 of the first electrode 120 and the second sub-electrode 162 of the second electrode 160 may be referred to as branch electrodes.

Referring to FIG. 1B, the plurality of second sub-electrodes 122 of the first electrode 120 and the plurality of second sub-electrodes 162 of the second electrode 160 are alternately disposed in the cell CE. In other words, the plurality of second sub-electrodes 162 of the second electrode 160 are disposed between the plurality of second sub-electrodes 122 of the first electrode 120, and the plurality of second sub-electrodes 122 of the first electrode 120 are disposed between the plurality of second sub-electrodes 162 of the second electrode 160. Accordingly, the first sub-electrode 121 and the plurality of second sub-electrodes 122 of the first electrode 120 surround the plurality of second sub-electrodes 162 of the second electrode 160, while the first sub-electrode 161 and the plurality of second sub-electrodes 162 of the second electrode 160 surround the plurality of second sub-electrodes 122 of the first electrode 120. In the touch sensitive device 100 according to an embodiment of the present disclosure, since the plurality of second sub-electrodes 122 of the first electrode 120 and the plurality of second sub-electrodes 162 of the second electrode 160 are alternately disposed, the portions where the first electrode 120 and the second electrode 160 are adjacent to each other can be increased, so the magnitude of the electric field applied to the electroactive layer 110 when a voltage is applied to the first electrode 120 and the second electrode 160 can be increased. Further, it is possible to maximize the portions where the first electrode 120 and the second electrode 160 are adjacent to each other by adjusting the width W1 of the first electrode 120, the width W2 of the second electrode 160, the lengths L1 of the plurality of second sub-electrodes 122 of the first electrode 120, and the lengths L2 of the plurality of second sub-electrodes 162 of the second electrode 160.

Referring to FIG. 1A again, the first wires 131 and the second wires 132 are electrically connected with the first electrodes 120 and the second electrodes 160 in the cells CE, respectively, on the electroactive layer 110. In more detail, the first wires 131 are electrically connected with the first electrodes 120 in the cells CE and the second wires 132 are electrically connected with the second electrodes 160 in the cells CE. The first wires 131 and the second wires 132 may be made of a material that is the same as or different from that of the first electrode 120 and the second electrode 160. When the first wires 131 and the second wires 132 may be made of the same material as the first electrode 120 and the second electrode 160, the first wires 131 and the second wires 132 may be formed simultaneously with the first electrode 120 and the second electrode 160.

The FPCB (Flexible Printed Circuit Board) 140 is disposed on the surface of the electroactive layer 110. The FPCB 140 is electrically connected with the first wires 131 and the second wires 132 and a circuit 141 such as a driving IC (Integrated Circuit) for applying a voltage to the first electrode 120 and the second electrode 160 through the first wires 131 and the second wires 132 may be disposed in the FPCB 140. Although the circuit 141 such as a driving IC is disposed in the FPCB 140 in FIG. 1A, it is not limited thereto and may be implemented in the type of a COF (Chip On Film).

The touch sensitive device 100 according to an embodiment of the present invention may be driven, as follows. For example, in order to deliver touch sense feedback through one cell CE on the electroactive layer 110, a first voltage is applied to the first electrode 120 of the cell through the first wire 131 electrically connected with the first electrode 120 and a second voltage is applied to the second electrode 160 of the cell CE through the second wire 132 electrically connected with the second electrode 160. For example, positive voltage is applied to the first electrode 120 and the second electrode 160 is grounded, so a potential difference may be generated between the first electrode 120 and the second electrode 160. The potential difference generates an electric field in the area on the electroactive layer 110 which corresponds to the cell CE of the touch sensitive device 100, so the electroactive layer 110 vibrates and a user can feel touch sense feedback. Although a positive voltage is applied to the first electrode 120 and the second electrode 160 is grounded in the above description, in contrast, the first electrode 120 may be grounded and a positive voltage may be applied to the second electrode 160.

Further, the first voltage and the second voltage that are applied to the first electrodes 120 and the second electrodes 160 of the touch sensitive device 100 according to an embodiment of the present disclosure may be AC voltages having predetermined frequencies. Also, the touch sensitive device 100 can deliver various touch sense feedbacks to a user, depending on the frequencies of the first voltage and the second voltage. The method of driving the touch sensitive device described above will be described below with reference to FIGS. 7A to 7C and FIGS. 14 to 20.

In the touch sensitive device 100 according to an embodiment of the present disclosure, the first electrodes 120 and the second electrodes 160 are disposed only on one surface of the electroactive layer 110. Accordingly, when the first electrodes 120 and the second electrodes 160 are made of the same material, they can be formed through only one process. Therefore, there is no need for a process of aligning the first electrode 120 and the second electrode 160 during manufacturing the touch sensitive device 100 according to an embodiment of the present disclosure, as compared with the case when one of the first electrode 120 and the second electrode 160 is formed on the top surface of the electroactive layer 110 and the other one is formed on the bottom surface of the electroactive layer 110. Accordingly, the process of manufacturing the touch sensitive device 100 according to an embodiment of the present disclosure can be further simplified, which yields manufacturing efficacy gains.

Further, since the first electrodes 120 and the second electrodes 160 are formed on only one surface of the electroactive layer 110, a dielectric elastomer having a low Young's modulus can be used for the electroactive layer 110 (e.g., more flexible materials can be utilized). When one of the first electrodes 120 and the second electrodes 160 is formed on the top surface of the electroactive layer 110 and the other one is formed on the bottom surface of the electroactive layer 110, to form the first electrodes 120, a dielectric elastomer may be attached to a support substrate and then deposited and sputtered. Thereafter, the dielectric elastomer is released from the support substrate to form the second electrodes 160, but the dielectric elastomer has a low Young's modulus, so the first electrodes 120 may be damaged in the process of releasing the dielectric elastomer from the support substrate (e.g., the flexible electrodes on the bottom can stick to the support substrate). However, in the touch sensitive device 100 according to an embodiment of the present disclosure, since the first electrodes 120 and the second electrodes 160 are formed on the same surface of the electroactive layer 110, there is no need for a process of releasing a dielectric elastomer from a support substrate. Accordingly, the touch sensitive device 100 may not be damaged in the process of forming the first electrodes 120 and the second electrodes 160.

Further, it is possible to improve the transmissivity and reduce the driving voltage of the touch sensitive device 100 according to an embodiment of the present disclosure. Improvement of the transmissivity of the touch sensitive device is described in detail with reference to FIG. 2.

Figure 2:
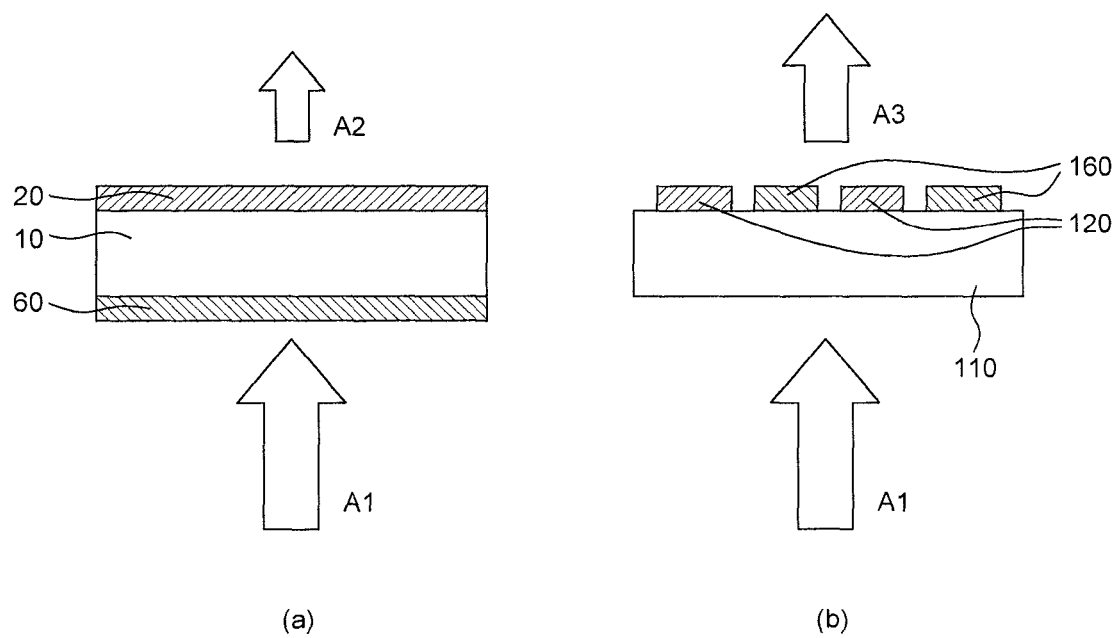
FIG. 2 is schematic cross-sectional views illustrating transmissivity of the touch sensitive device according to an embodiment of the present disclosure.

FIG. 2 is a schematic cross-sectional view illustrating transmissivity of the touch sensitive device according to an embodiment of the present disclosure. In various components, only electroactive layers 10 and 110, first electrodes 20 and 120, and second electrodes 60 and 160 are illustrated in FIG. 2 for the convenience of description.

FIG. 2(a) illustrates a comparative example of a touch sensitive device, in which the first electrode 20 is disposed on the top surface of the electroactive layer 10 and the second electrode 60 is disposed on the bottom surface of the electroactive layer 10. FIG. 2(b) illustrates an embodiment, which is the touch sensitive device 100 described with reference to FIGS. 1A to 1C. It is assumed that the electroactive layer 10 of the comparative example and the electroactive layer 110 of the embodiment are made of the same dielectric elastomer having the same thickness, so they have the same transmissivity. In more detail, it is assumed that the transmissivity of the electroactive layer 10 of the comparative example and the electroactive layer 110 of the embodiment is 85.4%. Further, it is assumed that the first electrode 20 and the second electrode 60 of the comparative example and the first electrode 120 and the second electrode 160 of the embodiment are all made of ITO and have transmissivity of 89%. Further, it is assumed in the embodiment that the first electrode 120 and the second electrode 160 occupy 40% of the top surface of the electroactive layer 110.

Referring to FIG. 2(a) first, in the comparative example, when light A1 travels into the second electrode 60 on the bottom surface of the electroactive layer 10, the ratio of light A2 traveling through the first electrode 20 on the top surface of the electroactive layer 10 to the incoming light A1 is the transmissivity (A2/A1) of the touch sensitive device of the comparative example, which can be determined as follows.

$$A2/A1 = \text{transmissivity of the second electrode } 60 \times \text{transmissivity of the electroactive layer } 10 \times \text{transmissivity of the first electrode } 20 = 0.89 \times 0.854 \times 0.89 = 0.676 \quad \text{(Equation 1)}$$

As calculated through Equation 1, the transmissivity (A2/A1) of the touch sensitive device of the comparative example is just 67.6%.

Next, referring to FIG. 2(b), in the embodiment, when light A1 travels into the bottom surface of the electroactive layer 110, the ratio of light A3 traveling out of and through the first electrode 120 and the second electrode 160 on the top surface of the electroactive layer 110 to the incoming light A1 is the transmissivity (A3/A1) of the touch sensitive device of the embodiment, which can be determined as follows.

$$A3/A1 = \text{transmissivity of the electroactive layer } 110 \times \text{(the ratio of the area of the top surface of the electroactive layer } 110 \text{ wherein the first electrode } 120 \text{ and the second electrode } 160 \text{ are not disposed} + \text{(the ratio of the area with the first electrode } 120 \text{ and the second electrode } 160 \text{ of the top surface of the electroactive layer } 110 \times \text{transmissivity of the first electrode } 120 \text{ and the second electrode } 160)) = 0.854 \times (0.6 + (0.4 \times 0.89)) = 0.816 \quad \text{(Equation 2)}$$

As calculated through Equation 2, the transmissivity (A3/A1) of the touch sensitive device of the embodiment is 81.6%, which is about 1.2 times the transmissivity (A2/A1) of the touch sensitive device of the comparative example. Accordingly, it can be seen that the transmissivity of the touch sensitive device 100 according to an embodiment of the present disclosure is improved, as compared with the case when one of the first electrode 120 and the second electrode 160 is disposed on the top surface of the electroactive layer 110 and the other one is disposed on the bottom surface of the electroactive layer 110.

Figure 3:
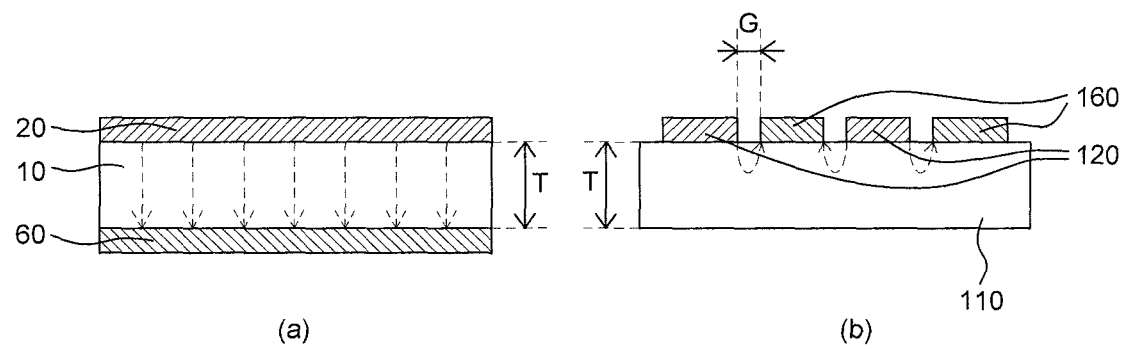
FIG. 3 is schematic cross-sectional views illustrating a driving voltage of the touch sensitive device according to an embodiment of the present disclosure.

Improvement of a driving voltage of a touch sensitive device is described in detail hereafter with reference to FIG. 3.

FIG. 3 is a schematic cross-sectional view illustrating a driving voltage of the touch sensitive device according to an embodiment of the present disclosure. In various components, only electroactive layers 10 and 110, first electrodes 20 and 120, and second electrodes 60 and 160 are illustrated in FIG. 3 for the convenience of description.

FIG. 3(a) illustrates a comparative example of a touch sensitive device, in which the first electrode 20 is disposed on the top surface of the electroactive layer 10 and the second electrode 60 is disposed on the bottom surface of the electroactive layer 10. Further, a positive voltage is applied to the first electrode 20 and the second electrode 60 is grounded. FIG. 3(b) illustrates an embodiment of the touch sensitive device 100 described with reference to FIGS. 1A to 1C, in which a positive voltage is applied to the first electrode 120 and the second electrode 160 is grounded. It is assumed that the electroactive layer 10 of the comparative example and the electroactive layer 110 of the embodiment are made of the same dielectric elastomer having the same thickness T. Further, in the embodiment, it is assumed that the gap G between the first electrode 120 and the second electrode 160 is smaller than the thickness T of the electroactive layer 110. Further, it is assumed that the magnitude of the positive voltage applied to the first electrode 20 in the comparative example and the magnitude of the positive voltage applied to the first electrode 120 in the embodiment are the same.

The magnitude of the electric field between two electrodes is calculated by the following Equation 3.

$$E = V/d \quad \text{(Equation 3)}$$

In Equation 3, E is the magnitude of an electric field, d is the distance between two electrodes, and V is a potential difference between two electrodes.

Referring to Equation 3, the magnitudes of the electric fields applied to the electroactive layers 10 and 110 in both of the comparative example illustrated in FIG. 3(a) and the embodiment illustrated in FIG. 3(b) are in proportion to the potential differences between the first electrodes 20 and 120. Further, the second electrodes 60 and 160 are in inverse proportion to the distances between the first electrodes 20 and 120 and the second electrodes 60 and 160. As described above, since the magnitude of the positive voltage applied to the first electrode 20 in the comparative example and the magnitude of the positive voltage applied to the first electrode 120 in the embodiment are the same, the potential difference between the first electrode 20 and the second electrode 60 in the comparative example and the potential difference between the first electrode 120 and the second electrode 160 in the embodiment would be the same if the distances between the electrodes are the same. Accordingly, the magnitude of the electric field applied to the electroactive layer 10 depends on the distance between the first electrode 20 and the second electrode 60 in the comparative example. Also, the magnitude of the electric field applied to the electroactive layer 110 depends on the distance between the first electrode 120 and the second electrode 160 in the embodiment.

Further, the distance between the first electrode 20 and the second electrode 60 is the same as the thickness T of the electroactive layer 10 in the comparative example and the distance between the first electrode 120 and the second electrode 160 is the same as the gap G therebetween in the embodiment. In this instance, as described above, since the thickness T of the electroactive layer 10 in the comparative example is larger than the gap G between the first electrode 120 and the second electrode 160 in the embodiment, the magnitude of the electric field applied to the electroactive layer 110 in the embodiment is larger than the magnitude of the electric field applied to the electroactive layer 10 in the comparative example. Further, the magnitude of the driving voltage required for generating electric fields having the same magnitude is lower in the embodiment than in the comparative example, since the distance between the first electrode 120 and the second electrode 160 is shorter.

Further, it may be considered to reduce the thickness of the electroactive layer 10 that is the distance between the first electrode 20 and the second electrode 60 in order to reduce the driving voltage in the comparative example described above. However, when the thickness T of the electroactive layer 10 reduces, the electroactive layer 10 cannot resist the weight of an object to be vibrated through the electroactive layer 10, so it may be difficult to generate vibration. Accordingly, reducing the thickness T of the electroactive layer 10 has a limit in reducing the driving voltage.

When the first electrode 20 and the second electrode 60 are formed on the top surface and the bottom surface of the electroactive layer 10, respectively, as in the comparative example, the magnitude of the driving voltage required for obtaining the same magnitude of vibration in the touch sensitive device 100 according to an embodiment of the present disclosure decreases. Accordingly, a driving voltage that is strong enough for driving the touch sensitive device 100 can be applied even without a specific boosting circuit. Further, in the touch sensitive device 100 according to an embodiment of the present disclosure, since only the positions of the first electrode 120 and the second electrode 160 are changed without reducing the thickness T of the electroactive layer 110, the magnitude of the driving voltage can be reduced without decreasing the vibration intensity or sacrificing stiffness of the electroactive layer 110.

Figure 4:
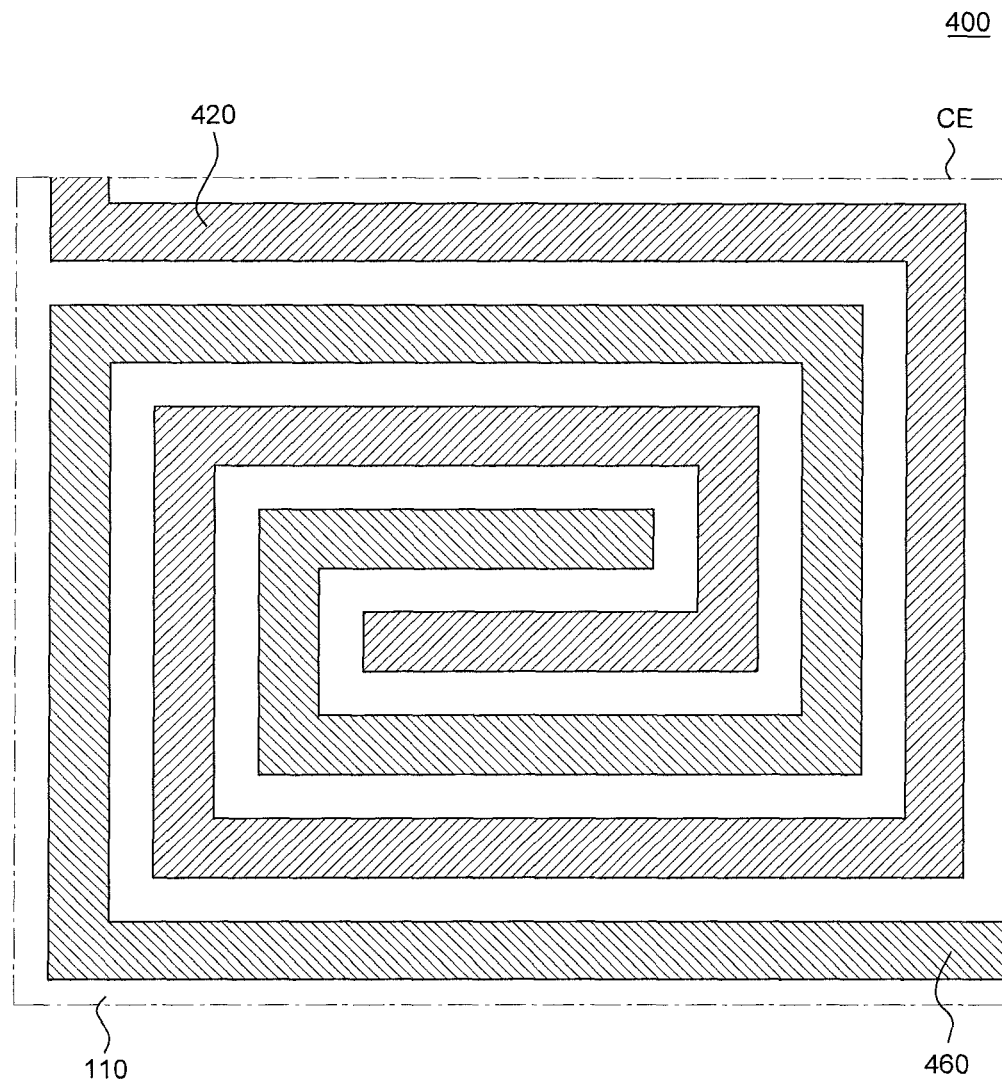
FIGS. 4 to 6 are schematic enlarged plan views illustrating touch sensitive devices according to various embodiments of the present disclosure.
Figure 5:
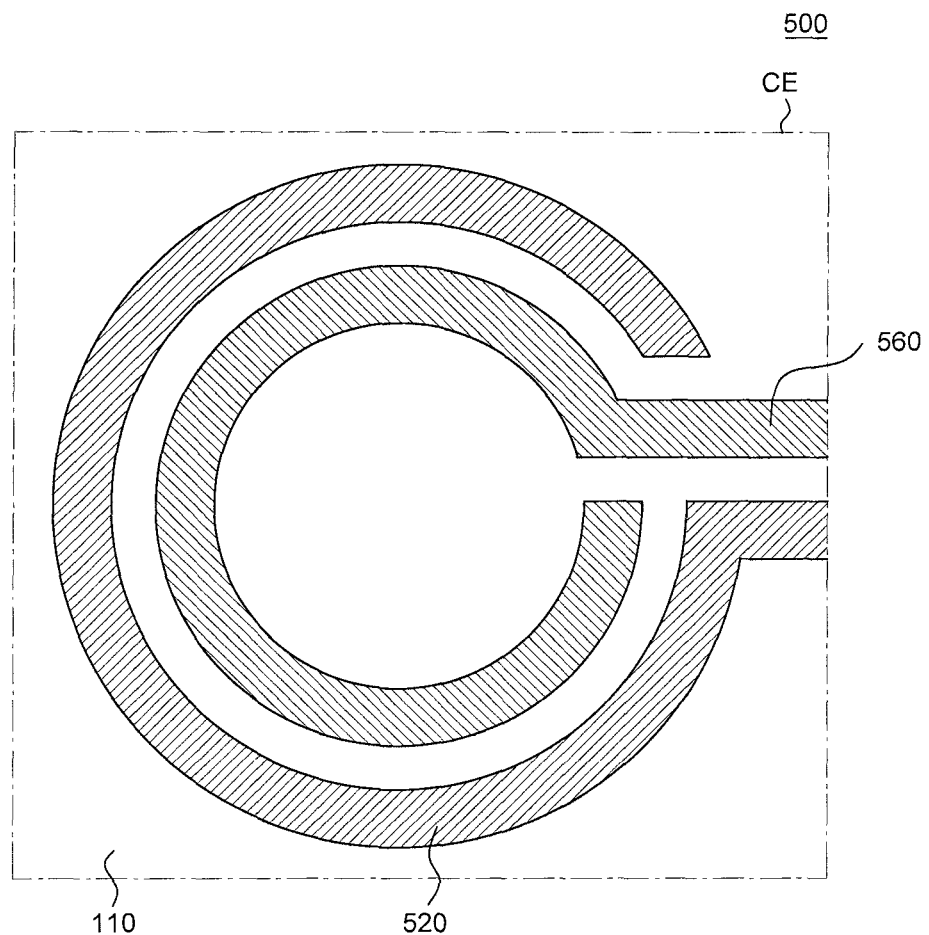
Figure 6:
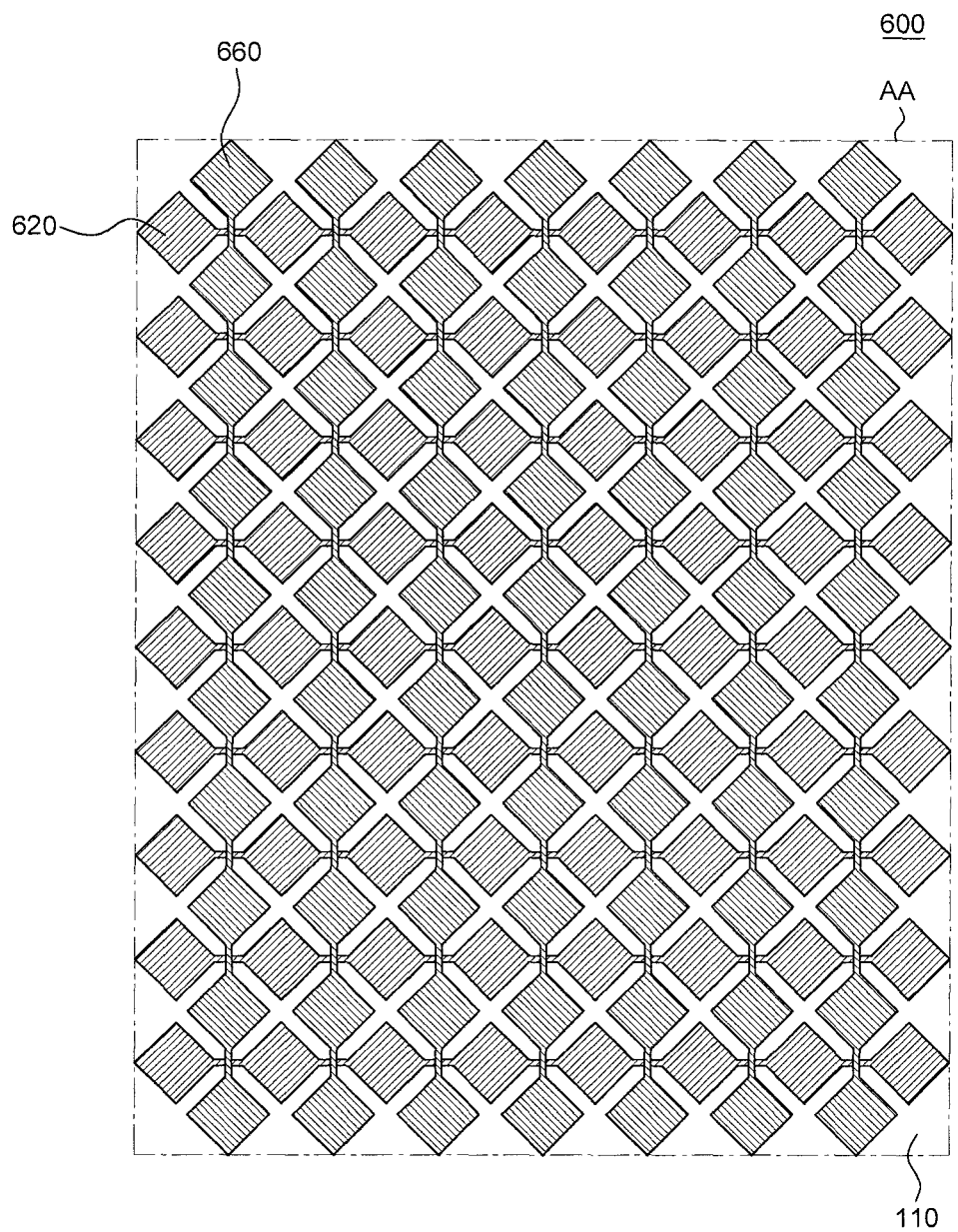

FIGS. 4 to 6 are schematic enlarged plan views illustrating touch sensitive devices according to various embodiments of the present disclosure. FIGS. 4 and 5 illustrate only first electrodes 420 and 520 and second electrodes 460 and 560 disposed in cells CE, respectively, in touch sensitive devices 400 and 500. Further, FIG. 6 illustrates a first electrode 620 and a second electrode 660 disposed in an active area AA of an electroactive layer 110 of a touch sensitive device 600. The touch sensitive devices 400, 500, and 600 illustrated in FIGS. 4 to 6 are different only in the shapes of the first electrodes 420, 520, and 620 and the second electrodes 460, 560, and 660 in comparison to the touch sensitive device 100 illustrated in FIGS. 1A to 1C and the other components are substantially the same, so repeated description is not provided.

First, referring to FIGS. 4 and 5, the first electrodes 420 and 520 and the second electrodes 460 and 560 may have a structure for maximizing the portions where they are adjacent to each other. For example, as illustrated in FIG. 4, the first electrode 420 and the second electrode 460 may be formed in a spiral shape. In another example, as illustrated in FIG. 5, the first electrode 520 and the second electrode 560 may be formed in a double loop shape. However, the shapes of the first electrodes 420 and 520 and the second electrodes 460 and 560 are not limited to those illustrated in FIGS. 4 and 5.

Next, referring to FIG. 6, the first electrode 620 and the second electrode 660 may be formed throughout the active area AA of the electroactive layer 110. For example, as illustrated in FIG. 6, the first electrodes 620 may extend transversely in the active area AA of the electroactive layer 110 and the second electrodes 660 may extend longitudinally in the active area AA of the electroactive layer 110. In this instance, a specific insulating layer may be disposed between the first electrodes 620 and the second electrodes 660 at least at the intersections of the first electrodes 620 and the second electrodes 660 to electrically connect them. Although the first electrodes 620 and the second electrodes 660 are formed in a diamond shape in FIG. 6 for the convenience of description, they are not limited thereto.

Figure 7A:
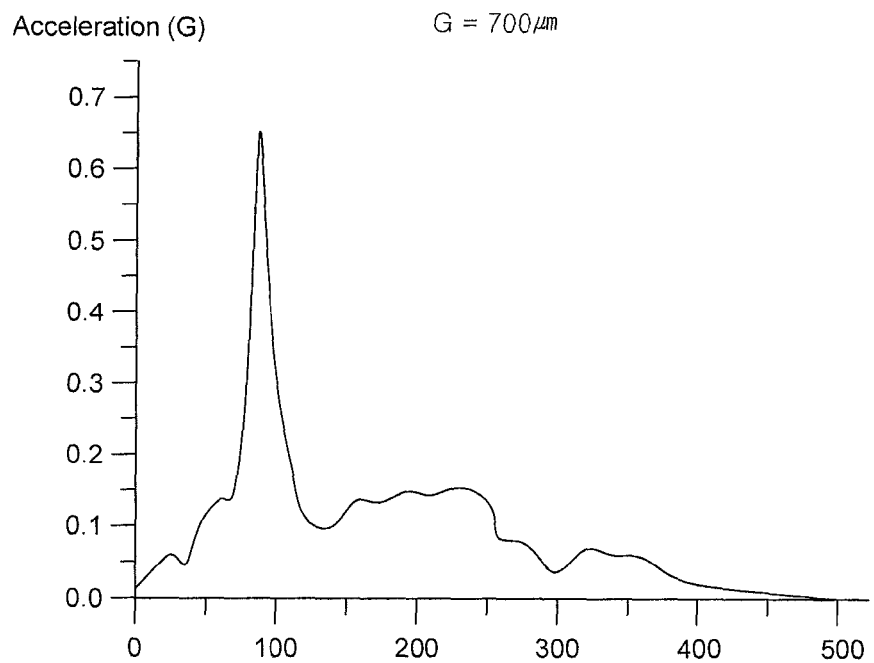
FIGS. 7A to 7C are graphs illustrating a resonance frequency and vibration intensity according to electrode gaps in a method of driving a touch sensitive device according to an embodiment of the present disclosure.
Figure 7B:
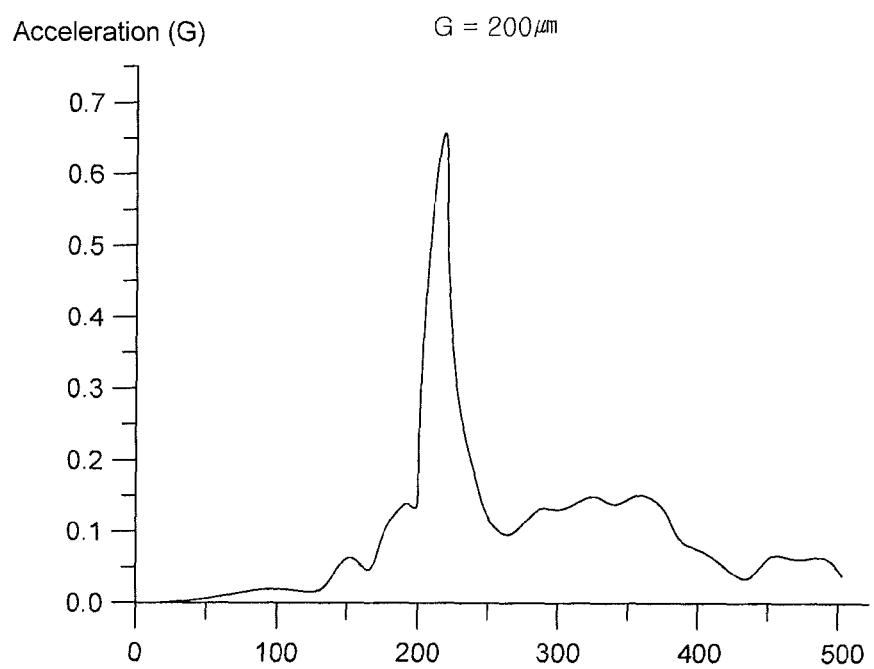
Figure 7C:
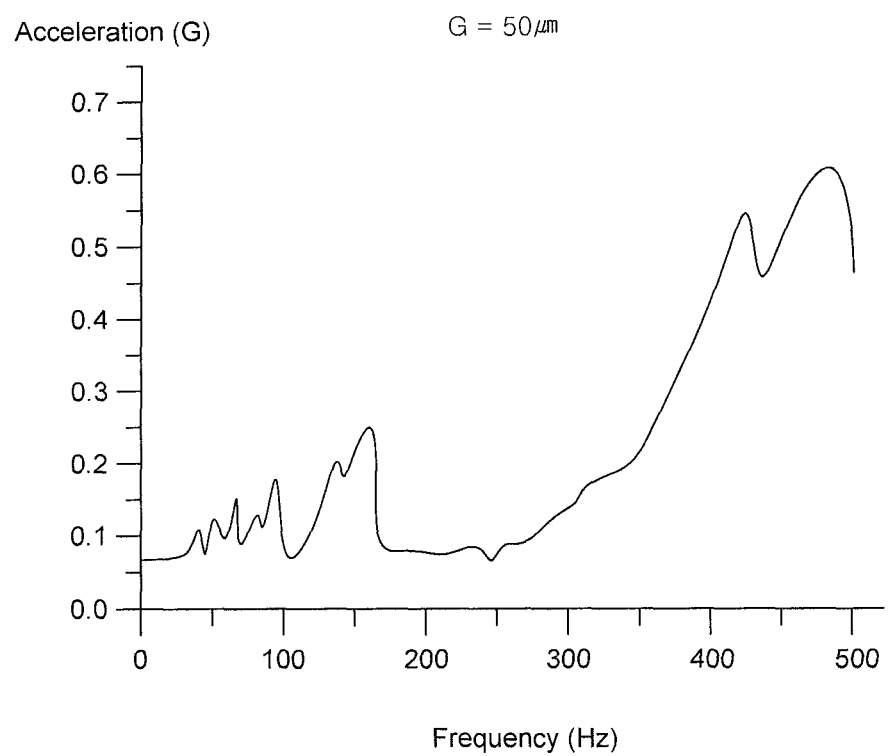

FIGS. 7A to 7C are graphs and tables illustrating a resonance frequency and vibration intensity according to electrode gaps in a method of driving a touch sensitive device according to an embodiment of the present invention. In FIG. 7A to 7C, touch sensitive devices 100 were formed such that the gaps G between the first electrode 120 and the second electrode 160 were each 700 µm, 200 µm, and 50 µm in the touch sensitive devices 100 illustrated in FIGS. 1A to 1C and then vibration intensity (vibration acceleration) was measured by sequentially applying voltages having frequencies from 0 Hz to 500 Hz to the touch sensitive devices 100, which is illustrated in the graphs. In more detail, the first electrode 120 and the second electrode 160 were formed such that the width W1 of the first electrode 120 and the width W2 of the second electrode 160 were 2 mm, the length L1 of the second sub-electrode 122 of the first electrode 120 and the length L2 of the second sub-electrode 162 of the second electrode 160 were 15 mm, and the thicknesses of the first electrode 120 and the second electrode 160 were 250 mm. In this instance, a PVDF film having a thickness of 80 µm was used for the electroactive layer 110. Further, the second electrode 160 was grounded, a first voltage that is a square wave voltage of 750 V was applied to the first electrode 120, the frequency of the first voltage was changed from 0 Hz to 500 Hz, and the vibration intensity was measured under this condition.

First referring to FIG. 7A, when the gap G between the first electrode 120 and the second electrode 160 was 700 µm and a first voltage having a frequency of 85 Hz was applied, the measured maximum vibration intensity was 0.66 G. Further, when the electrode gap G was 700 µm, the measured resonance frequency was 85 Hz. Next, referring to FIG. 7B, when the gap G between the first electrode 120 and the second electrode 160 was 200 µm and a first voltage having a frequency of 220 Hz was applied, the measured maximum vibration intensity was 0.67 G. Further, when the electrode gap G was 200 µm, the measured resonance frequency was 220 Hz. Finally, referring to FIG. 7C, when the gap G between the first electrode 120 and the second electrode 160 was 50 µm and a first voltage having a frequency of 480 Hz was applied, the measured maximum vibration intensity was 0.65 G. Further, when the electrode gap G was 50 µm, the measured resonance frequency was 480 Hz. The relationship between a resonance frequency and vibration intensity according to the electrode gaps G described above is as follows.

TABLE 1

| Electrode gap (G) | Resonance frequency | Vibration intensity |
| --- | --- | --- |
| 50 µm | 480 Hz | 0.65 G |
| 200 µm | 220 Hz | 0.67 G |
| 700 µm | 85 Hz | 0.66 G |

Referring to Table 1, when only the frequency of the first voltage is changed while maintaining the amplitude of the first voltage applied to the first electrode 120, the resonance frequencies are different in accordance with the gap G between the first electrode 120 and the second electrode 160. That is, the larger the electrode gap G, the smaller the resonance frequency, and the smaller the electrode gap G, the larger the resonance frequency. Accordingly, the smaller the electrode gap G, the larger the vibration intensity at higher frequencies, and the larger the electrode gag G, the larger the vibration intensity at lower frequencies.

Accordingly, in the method of driving a touch sensitive device according to an embodiment of the present disclosure, the first voltage applied to the first electrode 120 and the second voltage applied to the second electrode 160 may have a resonance frequency that is defined according to the gap G between the first electrode 120 and the second electrode 160. For example, when the gap G between the first electrode 120 and the second electrode 160 is 700 µm, a first voltage having a frequency of 85 Hz, which is the resonance frequency, is applied to the first electrode 120 and a second voltage that is a ground voltage GND is applied to the second electrode 160, the second electrode 160 can be grounded. That is, in the method of driving a touch sensitive device according to an embodiment of the present disclosure, when the touch sensitive device 100 is driven, the vibration intensity of the touch sensitive device can be improved by applying a voltage having a frequency set to the resonance frequency capable of generating the largest vibration intensity with the electrode gap G, to the touch sensitive device. Further, in the method of driving a touch sensitive device according to an embodiment of the present disclosure, since a voltage having a frequency corresponding to the resonance frequency according to the electrode gap G is applied to the touch sensitive device 100, a smaller driving voltage is required to obtain vibration intensity that is the same as that when a certain frequency is given to a touch sensitive device not in consideration of the electrode gag G. Accordingly, in the method of driving a touch sensitive device according to an embodiment of the present disclosure, the driving voltage can be reduced and power consumption can also be reduced without sacrificing vibration intensity.

Touch sensitive devices having various structures can be designed and various methods of driving those touch sensitive device can be achieved in accordance with the resonance frequencies and the vibration intensity depending on the electrode gaps described above. Touch sensitive devices having various structures based on the resonance frequencies and vibration intensity that is dependent on the electrode gaps as described above and a method of driving the same are described hereafter.

Figure 8A:
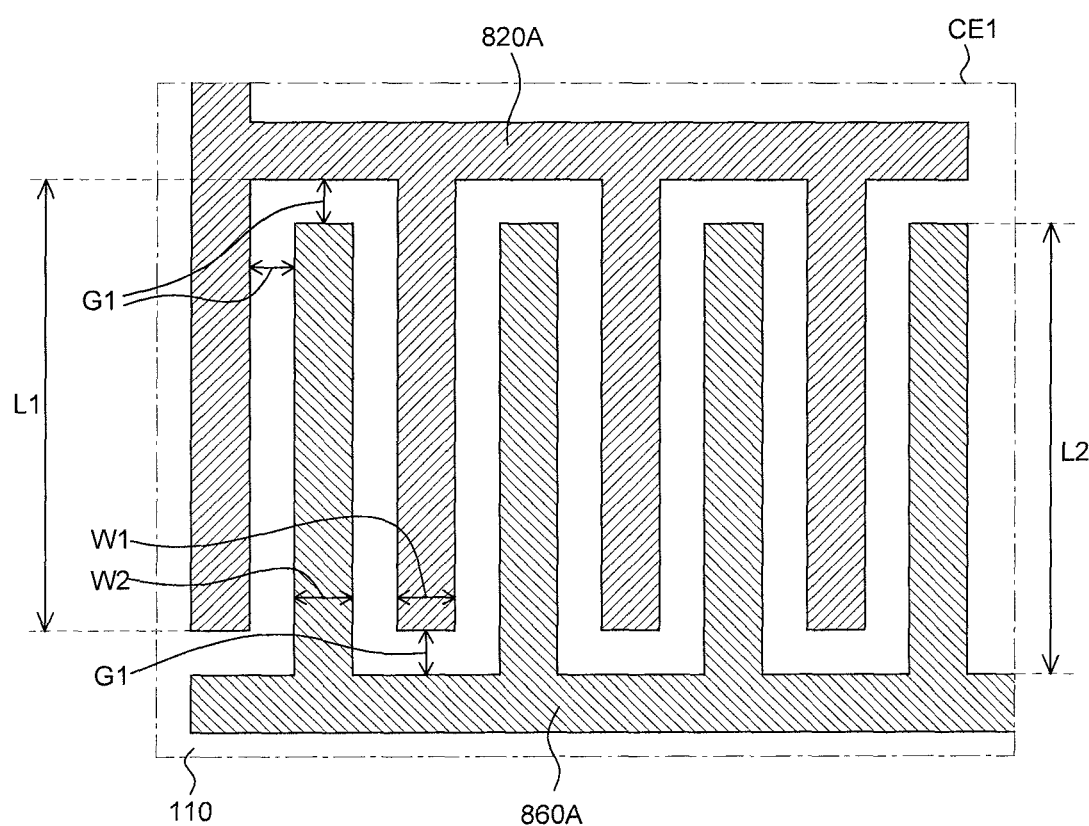
FIGS. 8A and 8B are schematic enlarged plan views illustrating touch sensitive devices according to other embodiments of the present disclosure.
Figure 8B:
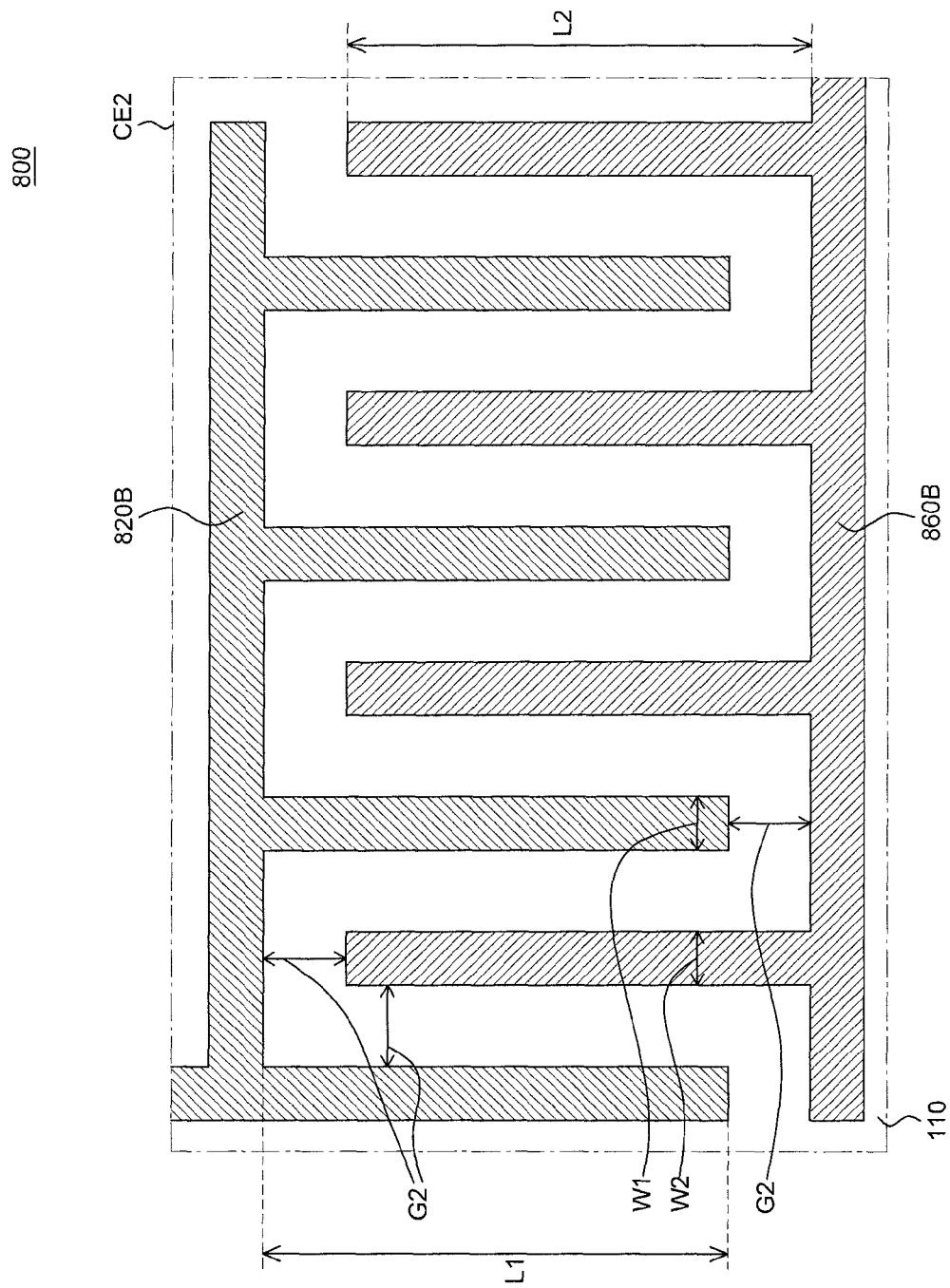

FIGS. 8A and 8B are schematic enlarged plan views illustrating touch sensitive devices according to other embodiments of the present disclosure. Only a first cell CE1 and a second cell CE2 that can be used in a touch sensitive device 800 are illustrated in FIGS. 8A and 8B, respectively. Further, the touch sensitive device 800 illustrated in FIGS. 8A and 8B is different in the gaps G1 and G2 between first electrodes 820A and 820B and second electrodes 860A and 860B, as compared with the touch sensitive device 100 illustrated in FIGS. 1A to 1C. However, the other components are substantially the same, so repeated description is not provided. It is assumed hereafter that the gap G1 is smaller than the gap G2.

Different touch sense feedbacks can be delivered to a user in accordance with the frequencies of driving voltages applied to the touch sensitive device 800. For example, when a low-frequency driving voltage is applied to the touch sensitive device 800, a rough touch sensitive feedback like touching a gravel or a glass beads can be provided to a user.

Further, when a high-frequency driving voltage is applied to the touch sensitive device 800, a smooth touch sensitive feedback like touching silk can be provided to a user. Accordingly, it is possible to deliver various touch sensitive feedbacks with a smaller driving voltage by adjusting the gaps G1 and G2 between the first electrodes 820A and 820B and the second electrodes 860A and 860B, respectively, disposed in the cells of the touch sensitive device 800.

For example, when the touch sensitive device 800 is configured to provide a smooth touch sense feedback to a user, the touch sensitive device 800 may include a first cell CE1 having a small gap G1 between the first electrode 820A and the second electrode 860A, as illustrated in FIG. 8A. As described above with reference to FIGS. 7A to 7C, the smaller the electrode gap G1, the larger the vibration intensity at a high frequency, while the larger the electrode gap G1, the larger the vibration intensity at a low frequency. That is, in order to deliver a smooth touch sense feedback to a user, it is required to apply a driving voltage having a high frequency to the touch sensitivity device 800. Thus, larger vibration intensity at a high frequency band can be achieved, when the electrode gap G1 is small, as illustrated in FIG. 8A, as compared with the case when the electrode gap G2 is large, as illustrated in FIG. 8B. Accordingly, in the touch sensitive device 800 for delivering a smooth touch sense feedback to a user, it is preferable that the electrode gap G1 between the first electrode 820A and the second electrode 860A is small, and a driving voltage having a frequency corresponding to the resonance frequency depending on the gap G1 between the first electrode 820A and the second electrode 860A may be applied in the process of driving the touch sensitive device 800. For example, when the electrode gap G1 is 50 μm, a first voltage at 480 Hz that is a resonance frequency may be applied to the first electrode 820A and the second electrode 860A may be grounded.

Further, when the touch sensitive device 800 is configured to deliver a rough touch sense feedback to a user (e.g., simulating a rough texture), the touch sensitive device 800 may include a second cell CE2 having a small gap G2 between the first electrode 820B and the second electrode 860B, as illustrated in FIG. 8B. As described above with reference to FIGS. 7A to 7C, the smaller the electrode gap G2, the larger the vibration intensity at a high frequency, while the larger the electrode gap G2, the larger the vibration intensity at a low frequency. For example, in order to provide a rough touch sense feedback to a user, it is required to apply a driving voltage having a low frequency to the touch sensitivity device 800. Thus, larger vibration intensity at a low frequency band can be achieved, when the electrode gap G1 is large, as illustrated in FIG. 8B, as compared with when the electrode gap G2 is small, as illustrated in FIG. 8A. Accordingly, in the touch sensitive device 800 for delivering a rough touch sense feedback to a user, it is preferable that the electrode gap G2 between the first electrode 820B and the second electrode 860B be large. Further, a driving voltage having a frequency corresponding to the resonance frequency that is dependent on the gap G2 between the first electrode 820B and the second electrode 860B may be applied in the process of driving the touch sensitive device 800. For example, when the electrode gap G2 is 700 μm, a first voltage at 85 Hz that is a resonance frequency may be applied to the first electrode 820B and the second electrode 860B may be grounded.

In some embodiments, the touch sensitive device 800 may be configured to deliver various touch sense feedbacks. In those cases, the touch sensitive device 800 may include both of the first cell CE1 illustrated in FIG. 8A and the second cell CE2 illustrated in FIG. 8B. That is, some of the cells of the touch sensitive device 800 may be the first cells CE1 and the others may be the second cells CE2. Accordingly, in order to deliver a smooth touch sense feedback to a user, it is possible to efficiently deliver a smooth touch sense feedback by applying a high-frequency driving voltage to the first cell CE1 of the touch sensitive device 800. Further, in order to deliver a rough touch sense feedback to a user, it is possible to efficiently deliver a rough touch sense feedback by applying a low-frequency driving voltage to the second cell CE2 of the touch sensitive device 800.

When the touch sensitive device 800 includes both of the first cell CE1 illustrated in FIG. 8A and the second cell CE2 illustrated in FIG. 8B, the touch sensitive device 800 can deliver a touch sensitive feedback with an even larger vibration intensity to a user, using a beat phenomenon. For example, when a voltage having a vibration waveform of $\sin(2\pi f1 t)$ at a first frequency f1 is applied to a first electrode 820A of the first cell CE1, a voltage having a vibration waveform of $\sin(2\pi f2 t)$ at a second frequency f2 is applied to a first electrode 820B of the second cell CE2, and a second electrode 860A of the first cell CE1 and a second electrode 860B of the second cell CE2 are grounded, a beat wave generated in the touch sensitive device 800 is expressed as in the following Equation 1.

$$\sin(2\pi f_1 t) + \sin(2\pi f_2 t) = 2\cos\left(2\pi \frac{f_1 - f_2}{2} t\right)\sin\left(2\pi \frac{f_1 - f_2}{2} t\right)$$

Theoretically, when two vibration waveforms having the same amplitude meet each other, the amplitude of the beat waveform can be doubled and the envelope of the beat wave substantially has a frequency of |f1−f2| (e.g., constructive interference). Accordingly, when the first frequency f1 is set to correspond to the electrode gap G1, the second frequency f2 is set to correspond to the electrode gap G2, and a driving voltage is applied simultaneously to the first cell CE1 and the second cell CE2, a touch sense feedback with larger vibration intensity can be delivered to a user by a beat phenomenon.

Referring to FIGS. 8A and 8B, the gaps G1 and G2 between the first electrodes 820A and 820B and the second electrodes 860A and 860B disposed in the cells of the touch sensitive device 800 are different in each cell. For example, in a plurality of cells, the gap G1 between the first electrode 820A and the second electrode 860A in the first cell CE1 illustrated in FIG. 8A and the gap G2 between the first electrode 820B and the second electrode 860B in the second cell CE2 illustrated in FIG. 8B may be different. The touch sensitive device 800 is described assuming that the gap G1 is smaller than the gap G2 hereafter.

Although the touch sensitive device 800 has two cells CE1 and CE2 having different electrode gaps G1 and G2 with reference to FIGS. 8A and 8B, the touch sensitive device 800 may include three or more cells having different electrode gaps. In this instance, it is possible to deliver various touch sense feedbacks with larger vibration intensity to a user by applying voltages having resonance frequencies depending on the electrode gaps to the cells, respectively. Also, the driving voltage of the touch sensitive device 800 for delivering a touch sense feedback having the same vibration intensity can be reduced.

Figure 9:
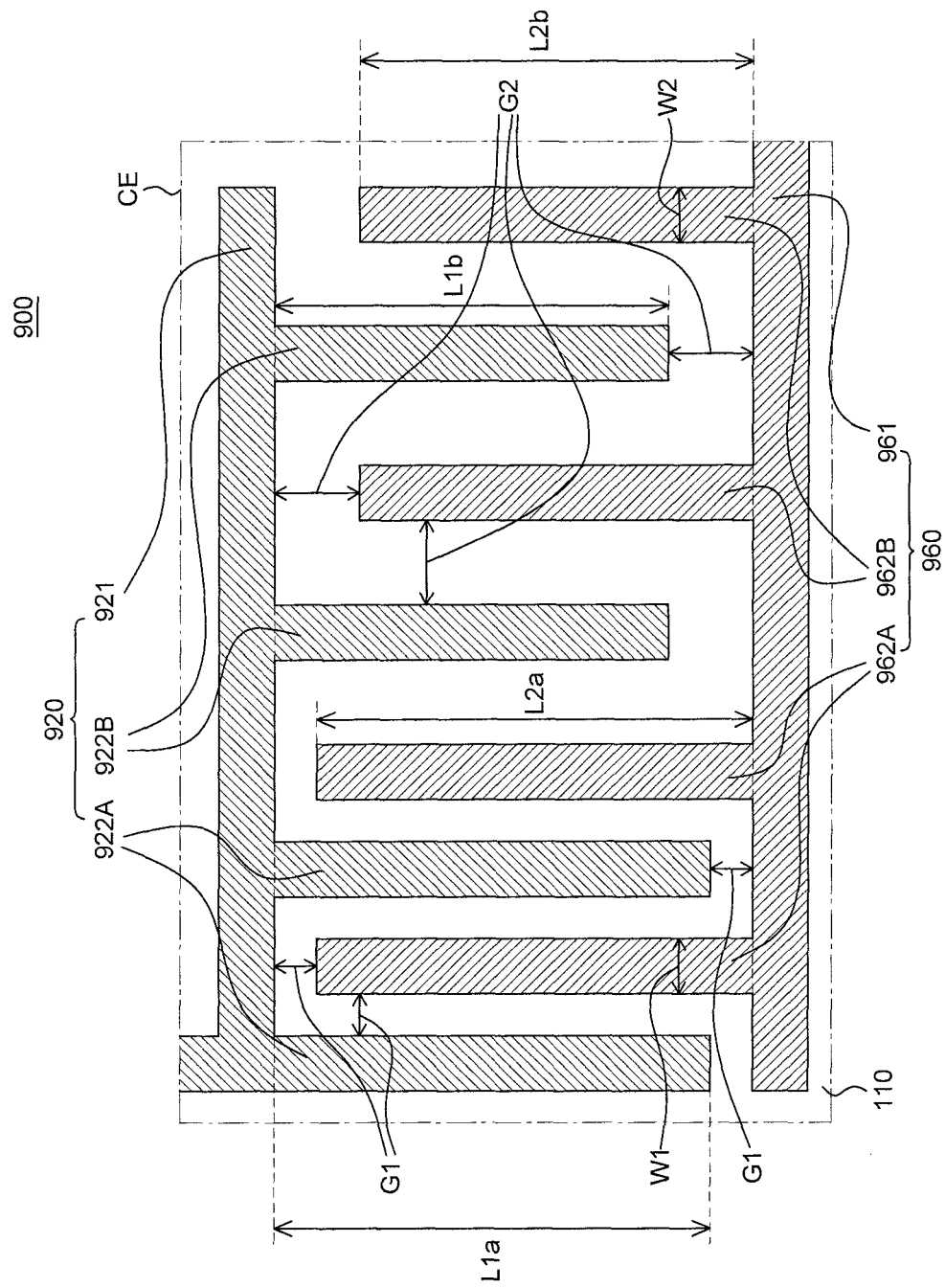
FIGS. 9 and 10 are schematic enlarged plan views illustrating touch sensitive devices according to various embodiments of the present disclosure.
Figure 10:
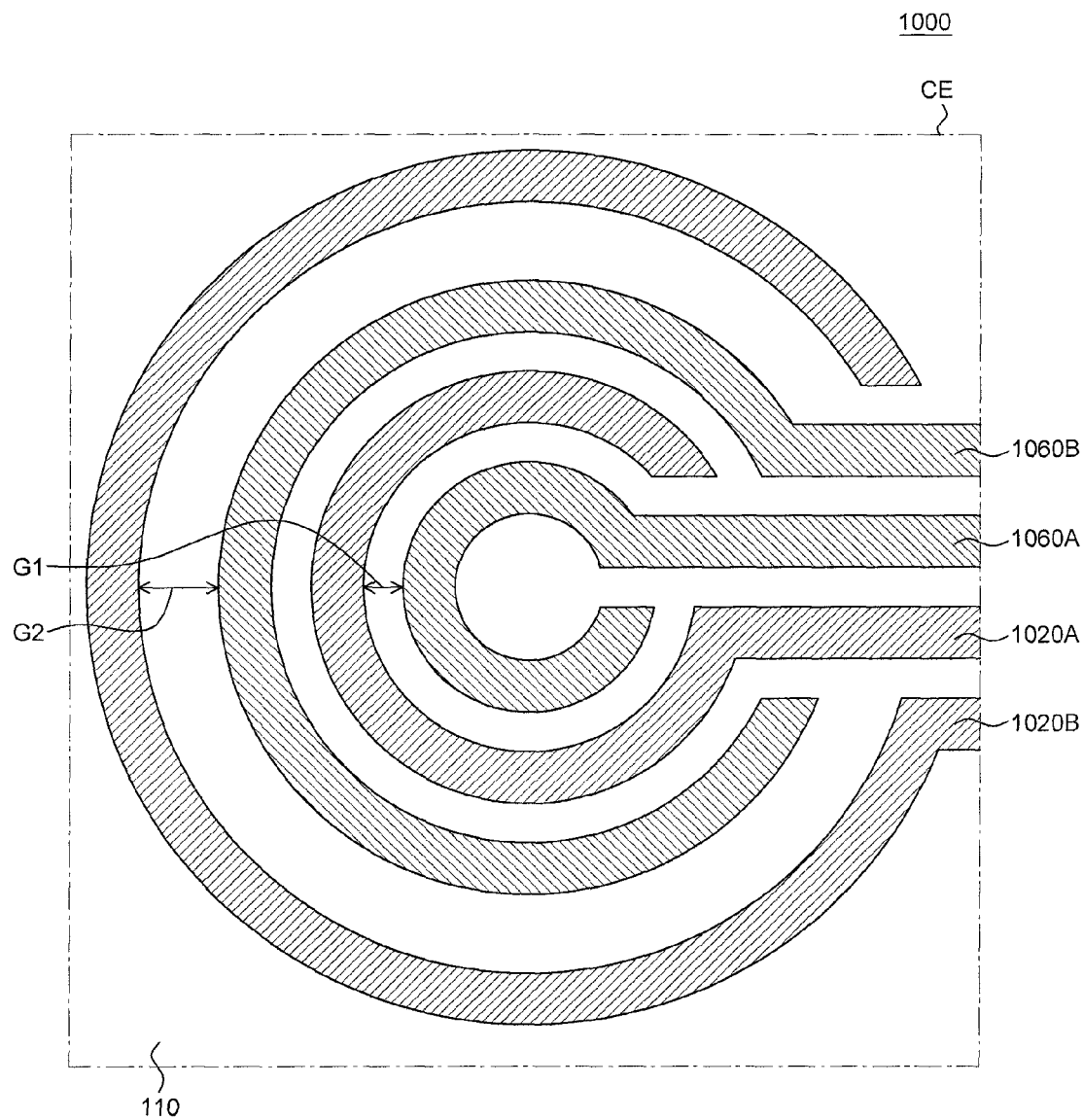

FIGS. 9 and 10 are schematic enlarged plan views illustrating touch sensitive devices according to various embodiments of the present disclosure. The touch sensitive devices 900 and 1000 illustrated in FIGS. 9 and 10, respectively, are different in the gaps G1 and G2 between first electrodes 920, 1020A, and 1020B and second electrodes 960, 1060A, and 1060B and the shapes of the first electrodes 920, 1020A, and 1020B and the second electrodes 960, 1060A, and 1060B, as compared with the touch sensitive device 100 illustrated in FIGS. 1A to 1C. However, other components are substantially the same, and thus, repeated description is not provided. It is assumed hereafter that the gap G1 is smaller than the gap G2.

First, referring to FIG. 9, the first electrode 920 has a portion spaced by a first gap G1 and a portion spaced at a second gap G2 from the second electrode 960 in the same cell CE. In more detail, a second sub-electrode 922A of the first electrode 920 is spaced by the first gap G1 from a first sub-electrode 961 and a second sub-electrode 962A of the second electrode 960. Further, a second sub-electrode 922B of the first electrode 920 is spaced by the first gap G2 from the first sub-electrode 961 and a second sub-electrode 962B of the second electrode 960. In order to achieve this electrode structure, as described above, the length L1a of the second sub-electrode 922A of the first electrode 920 is larger than the length L1b of the second sub-electrode 922B of the first electrode 920. Further, the length L2a of the second sub-electrode 962A of the second electrode 960 is larger than the length L2b of the second sub-electrode 962B of the second electrode 960. Since the first electrode 920 has the portion spaced by the first gap G1 and the portion spaced by the second gap G2 from the second electrode 960 disposed in the same cell CE2, the touch sensitive device 900 can deliver various touch sense feedbacks to a user through one cell CE.

Next, referring to FIG. 10, the first electrode 1020 has a portion spaced by a first gap G1 and a portion spaced at a second gap G2 from the second electrode 1060 disposed in the same cell CE. In more detail, the first electrode 1020A is spaced by the first gap G1 from the second electrode 1060A and the first electrode 1020B is spaced by the second gap G2 from the second electrode 1060B. Accordingly, the touch sensitive device 1000 can deliver various touch sense feedbacks to a user through one cell CE.

FIGS. 11A and 11B are also referred to describe in detail a method of driving a touch sensitive device to deliver various touch sense feedbacks to a user through the touch sensitive devices 900 and 1000 illustrated in FIGS. 9 and 10.

Figure 11:
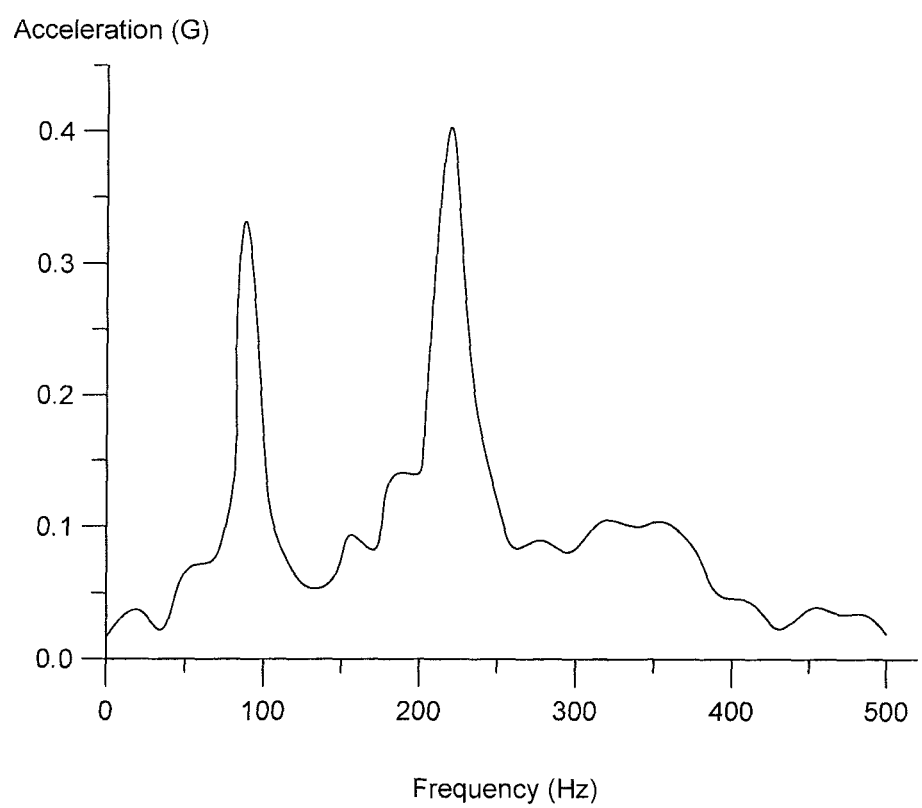
FIG. 11 is a graph illustrating a resonance frequency and vibration intensity in a method of driving a touch sensitive device according to another embodiment of the present disclosure.

FIG. 11 is a graph illustrating a resonance frequency and vibration intensity in a method of driving a touch sensitive device according to another embodiment of the present disclosure. FIG. 11 is a graph illustrating vibration intensity (vibration acceleration) measured by sequentially applying voltages having frequencies from 0 Hz to 500 Hz to a touch sensitive device 900, after forming the touch sensitive device 900 such that the electrode gap G1 is 200 μm and the electrode gap G2 is 700 μm in the touch sensitive device 900 illustrated in FIG. 9. In more detail, the first electrode 920 and the second electrode 960 were formed such that the width W1 between the first electrode 920 and the second electrode 960 is 2 mm, the length L1a of the second sub-electrode 922A of the first electrode 920 and the length L2a of the second sub-electrode 962A of the second electrode 960 is 15 mm, the length L1b of the second sub-electrode 922B of the first electrode 920 and the length L2b of the second sub-electrode 962B of the second electrode 960 is 14.3 mm, and the thicknesses of the first electrode 920 and the second electrode 960 is 250 nm. In this instance, a PVDF film having a thickness of 80 μm was used for the electroactive layer 110. Further, the second electrode 960 was grounded, a first voltage that is a square wave voltage of 750 V was applied to the first electrode 920, the frequency of the first voltage was changed from 0 Hz to 500 Hz, and the vibration intensity of the touch sensitive device 900 was measured under this condition.

As described with reference to FIG. 7A, when the gaps G2 between the first electrodes 120 and the second electrodes 160 were all 700 μm and a first voltage having a frequency of 85 Hz was applied, the measured maximum vibration intensity was 0.66 G. Further, as described with reference to FIG. 7B, when the gaps G1 between the first electrodes 120 and the second electrodes 160 were all 200 μm and a first voltage having a frequency of 220 Hz was applied, the measured maximum vibration intensity was 0.67 G.

The first electrode 920 of the touch sensitive device 900 illustrated in FIG. 9 has a portion spaced by a first gap G1 of 200 μm and a portion spaced by a second gap G2 of 700 μm from the second electrode disposed in the same cell CE. Accordingly, when the frequency of the first voltage applied to the first electrode 920 was changed from 0 Hz to 500 Hz, peaks of vibration intensity were measured at 212 Hz close to 220 Hz that is a resonance frequency corresponding to the first gap G1 and 88 Hz close to 85 Hz that is a resonance frequency corresponding to the second gap G2. That is, when a first voltage of 88 Hz is applied to the first electrode 920, the portion of the electroactive layer 110 where the first electrode 920 and the second electrode 960 are spaced apart by the first gap G1 is vibrated with the maximum vibration intensity. Further, when a first voltage of 212 Hz is applied to the first electrode 920, the portion of the electroactive layer 110 where the first electrode 920 and the second electrode 960 are spaced apart by the second gap G2 is vibrated with the maximum vibration intensity. The relationship between a resonance frequency and intensity of vibration at electrodes described above is listed in the following Table 2.

TABLE 2

| Electrode gap | Resonance frequency | Vibration intensity |
| --- | --- | --- |
| 200 μm (G1) | 220 Hz | 0.67 G |
| 700 μm (G2) | 85 Hz | 0.66 G |
| 200 μm & 700 μm | 88 Hz, 212 Hz | 0.33 G @ 88 Hz |
| | | 0.41 G @ 212 Hz |

Accordingly, in the method of driving a touch sensitive device according to another embodiment of the present disclosure, the second electrode 960 may be grounded and a first voltage having a resonance frequency corresponding to the first gap G1 may be applied to the first electrode 920 in order to deliver a smooth touch sense feedback to a user, while the second electrode 960 may be grounded and a first voltage having a resonance frequency corresponding to the second gap G2 may be applied to the first electrode 920 in order to deliver a rough touch sense feedback to a user. Accordingly, in the method of driving a touch sensitive device according to another embodiment of the present disclosure, it is possible to provide different touch sense feedbacks to a user by adjusting only the frequency of the driving voltage applied to one cell CE, using the touch sensitive device 900 in which the first electrode 920 and the second electrode 960 are spaced apart by the gaps G1 and G2 in one cell. Further, the frequencies of the driving voltages applied in this example are resonance frequencies corresponding to the electrode gaps G1 and G2, so the magnitude of a driving voltage required for delivering specific vibration intensity can be reduced.

Further, the vibration intensity at the resonance frequencies in FIG. 11 was reduced to a half the vibration intensity at the resonance frequencies in FIGS. 7A and 7B. This resulted from reduction of the areas of the electroactive layer 110 that were vibrated when a resonance frequency corresponding to the first gap G1 and when a resonance frequency corresponding to the second gap G2 was applied, with the first electrode 920 having both of the portion spaced by a first gap G1 and the portion spaced at a second gap G2 from the second electrode 960 in the same cell CE. Accordingly, it is possible to increase vibration intensity in one cell CE by adjusting the areas corresponding to the electrode gaps G1 and G2 in one cell CE. Further, when the touch sensitive device 900 has a plurality of cells CE, as in FIG. 9, the vibration intensity of the touch sensitive device 900 can be increased. Accordingly, even if a plurality of electrode gaps G1 and G2 are set in one cell CE, the touch sensitive device 900 can provide a touch sense feedback with sufficient vibration intensity.

Although the above description refers to FIG. 9, the first electrode 1020A is spaced by the first gap G1 away from the second electrode 1060A and the first electrode 1020B is spaced by the second gap G2 away from the second electrode 1060B also in the touch sensitive device 1000 illustrated in FIG. 10. Thus, the method of driving a touch sensitive device described above can be applied.

In some embodiments, a vertical electrode structure may be applied to the touch sensitive devices 100, 400, 500, 600, 800, and 900 described above. That is, an electrode can be formed not only on the top surface of the electroactive layer 110, but also on the bottom surface of the electroactive layer 110. In this instance, it is possible to apply a vertical electric field, in addition to a horizontal electric field to the electroactive layer 110 by applying voltages in various ways to the electrodes on the top surface and the bottom surface of the electroactive layer 110, so the electroactive layer 110 is more strongly vibrated. Accordingly, a stronger touch sense feedback can be delivered to a user.

Figure 12:
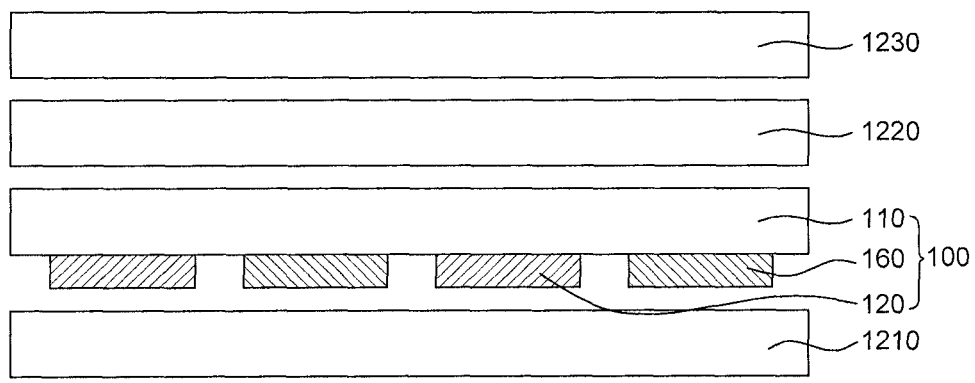
FIG. 12 is a schematic cross-sectional view illustrating a display device according to an embodiment of the present disclosure.

FIG. 12 is a schematic cross-sectional view illustrating a display device according to an embodiment of the present disclosure. Referring to FIG. 12, the display device 1200 includes a display panel 1210, the touch sensitive device 100 made of an electroactive polymer, a touch panel 1220, and a cover 1230.

Referring to FIG. 12, the display panel 1210 is disposed at a lower portion in the display device 1200. The display panel 1210 is a panel with display pixels for displaying an image in the display device 1200. As the display panel 1210, for example, various display panels such as an organic light emitting display panel, a liquid crystal display panel, and an electrophoretic display panel can be used.

The touch sensitive device 100 made of an electroactive polymer is disposed on the display panel 1210. Although the touch sensitive device 100 illustrated in FIG. 12 is the touch sensitive device 100 illustrated in FIGS. 1A to 1C, any one of the touch sensitive devices 400, 500, 600, 800, 900, and 1000 described with reference to FIGS. 4 to 6, FIGS. 8A and 8B, and FIGS. 9 and 10 may be used for the display device 1200. It is assumed in the following description that the touch sensitive device illustrated in FIG. 12 is the touch sensitive device 100 illustrated in FIGS. 1A to 1C. In more detail, the first electrodes 120 and the second electrodes 160 are formed on one surface of the electroactive layer 110. Referring to FIG. 12, the touch sensitive device 100 is disposed with the first electrodes 120 and the second electrodes 160 facing the display panel 1210. That is, the surface of the electroactive layer 110 where the first electrodes 120 and the second electrodes 160 are disposed faces the top surface of the display panel 1210.

The touch panel 1220 is disposed over the touch sensitive device 100. The touch panel 1220 is a panel that senses touch input on the display device 1200 by a user. As the touch panel 1220, for example, a capacitive type, a resistive type, an ultrasonic type, and an infrared type may be used, but preferably, a capacitive type touch panel may be used as the touch panel 1220.

As described above, the areas of the cells CE of the electroactive layer 110 may depend on the areas of pixels of a touch panel 1220 that is used with the electroactive layer 110. For example, when the cells CE of the touch sensitive device 100 have the same area as the pixels of a touch panel 1220 through which touch input by a user is sensed, the pixels of the touch panel 1220 and the cells CE of the touch sensitive device 100 can have one-to-one correspondence, so the touch sensitive device 100 can be more easily driven.

The cover 1230 is disposed over the touch panel 1220. The cover 1230 is provided for protecting the display device 1200 from an external shock. The cover 1230 may be made of a transparent insulating material.

In FIG. 12, bonding layers for bonding the display panel 1210, the touch sensitive device 100, the touch panel 1220, and the cover 1230 may be used. The bonding layer may be made of, for example, an OCA (Optical Clear Adhesive) or OCR (Optical Clear Resin), but is not limited thereto.

When one of the first electrodes 120 and the second electrodes 160 is formed on the top surface of the electroactive layer 110 and the other one is formed on the bottom surface of the electroactive layer 110, the first electrodes 120 or the second electrodes 160 are necessarily disposed between the electroactive layer 110 and the touch panel 1220. As described above, since the first electrodes 120 or the second electrodes 160 are disposed close to the touch panel 1220, a ghost phenomenon that the touch panel 1220 recognizes that there is a touch at a position where a user does not actually touch may be caused by the first electrodes 120 or the second electrodes 160. In particular, a high voltage of several kilovolts may be applied as a driving voltage for driving the electroactive touch sensitive device 100, the ghost phenomenon of the touch panel 1220 may become worse by the high voltage applied to the first electrodes 120 or the second electrodes 160. Accordingly, in order to prevent a noise signal being delivered from the touch sensitive device 100 to the touch panel 1220, a grounded transparent conductive film may be disposed, as a shield layer, between the touch panel 1220 and the touch sensitive device 100.

However, in the touch sensitive device 100 in the display device 1200 according to an embodiment of the present disclosure, the first electrodes 120 and the second electrodes 160 for applying an electric field to the electroactive layer 110 are only formed on one surface of the electroactive layer 110. Further, the touch sensitive device 100 is disposed between the display panel 1210 and the touch panel 1220 and the first electrodes 120 and the second electrodes 160 face the display panel 1210. Accordingly, the first electrodes 120 and the second electrodes 160 are not formed on the top surface of the electroactive layer 110 that is adjacent to the touch panel 1220. Further, the electroactive layer 110 is disposed between the first and second electrodes 120 and 160 and the touch panel 1220 and can function as a shield layer. Accordingly, in the display device 1200 according to an embodiment of the present disclosure, the first electrodes 120 and the second electrodes 160 are formed on the same surface of the electroactive layer 110 and face the display panel 1210. Thus, there is no need for a specific shield layer and a ghost phenomenon of the touch panel 1220, which may be generated by the voltage applied to the first electrodes 120 and the second electrodes 160, can be suppressed.

Figure 13:
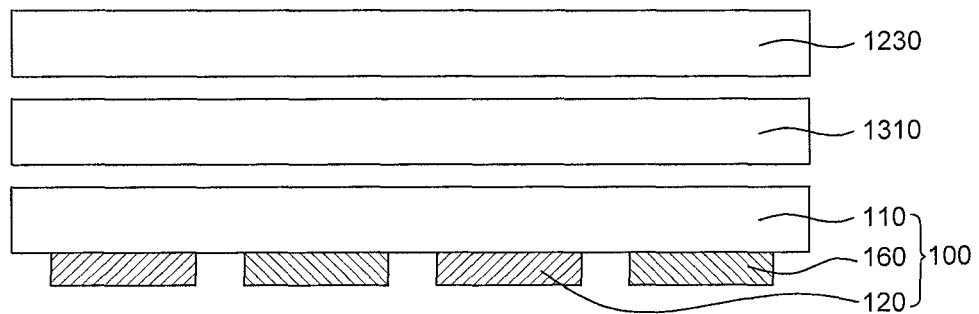
FIG. 13 is a schematic cross-sectional view illustrating a display device according to another embodiment of the present disclosure.

FIG. 13 is a schematic cross-sectional view illustrating a display device according to another embodiment of the present disclosure. The display device 1300 illustrated in FIG. 13 is different only in the function and the position of the display panel 1310, as compared with the display device 1200 illustrated in FIG. 12. Also, other components are substantially the same, so repeated description is not provided.

Referring to FIG. 13, the display panel 1310 is disposed between a cover 1230 and a touch sensitive device 100. The display panel 1310 is a panel with display pixels for displaying an image in the display device 1300 and also functions as a touch panel. That is, the display panel 1310 is a touch panel-integrated display panel 1310 having a touch panel therein, and for example, an in-cell type of touch panel may be provided in the display panel 1310. As the display panel 1310, for example, various display panels such as an organic light emitting display panel and a liquid crystal display panel maybe used.

The touch sensitive device 100 made of an electroactive polymer is disposed under the display panel 1310. In this instance, as illustrated in FIG. 13, first electrodes 120 and second electrodes 160 may be disposed on the bottom surface of the electroactive layer 110, and though not illustrated in FIG. 13, the first electrodes 120 and the second electrodes 160 may be disposed on the top surface of the electroactive layer 110. However, when the first electrodes 120 and the second electrodes 160 are disposed on the bottom surface of the electroactive layer 110, as illustrated in FIG. 13, it is possible to maximize the gap between the display panel 1310 having a touch panel therein and the first and second electrodes 120 and 160. Thus, it may be more advantageous in suppressing a ghost phenomenon that may be caused by a voltage applied to the first electrodes 120 or the second electrodes 160 (e.g., noise interference between the display panel 1310 and the touch sensitive device 100 can be further reduced).

As described above, when the display panel 1310 is a touch panel-integrated display panel 1310 having a touch panel therein, a shield layer may be disposed between the display panel 1310 having a touch panel therein and the touch sensitive device 100, in FIG. 13. That is, in order to minimize a noise signal delivered from the touch sensitive device 100 to the display panel 1310 having a touch panel therein, a shield layer such as a grounded transparent conductive film may be disposed between the display panel 1310 having a touch panel therein and the touch sensitive device 100.

In some embodiments, the touch sensitive device 100 may be disposed between the display panel 1310 having a touch panel therein and the cover 1230. In this instance, the first electrodes 120 and the second electrodes 160 may be disposed on the top surface or the bottom surface of the electroactive layer 110. Further, in order to minimize a noise signal delivered from the touch sensitive device 100 to the display panel 1310 having a touch panel therein, a shield layer may be disposed between the touch sensitive device 100 and the display panel 1310 having a touch panel therein.

Further, a structure using an electroactive layer can easily provide a sense of touch by vibration. But, it is difficult to deliver the textures of materials displayed on a display device. In order to deliver the texture of an object displayed on a display device, a structure using an electrostatic attractive force can be used. In more detail, an electrode is disposed on a surface of an insulating layer in the structure. When a voltage is applied to the electrode and a finger touches it, a coulomb force that is an electrostatic attractive force is generated between the finger and the insulating layer. When the finger moves on the insulating layer, electric texture is delivered by horizontal friction. However, when the finger stops in the structure, the sense of touch is not delivered. However, a display device including a touch sensitive device according to another embodiment of the present disclosure can be configured to achieve not only sense of touch by vibration, but texture by an electrostatic attractive force. A display device that can selectively provide sense of touch by vibration and the electrostatic attractive force is described in detail hereafter.

Figure 14:
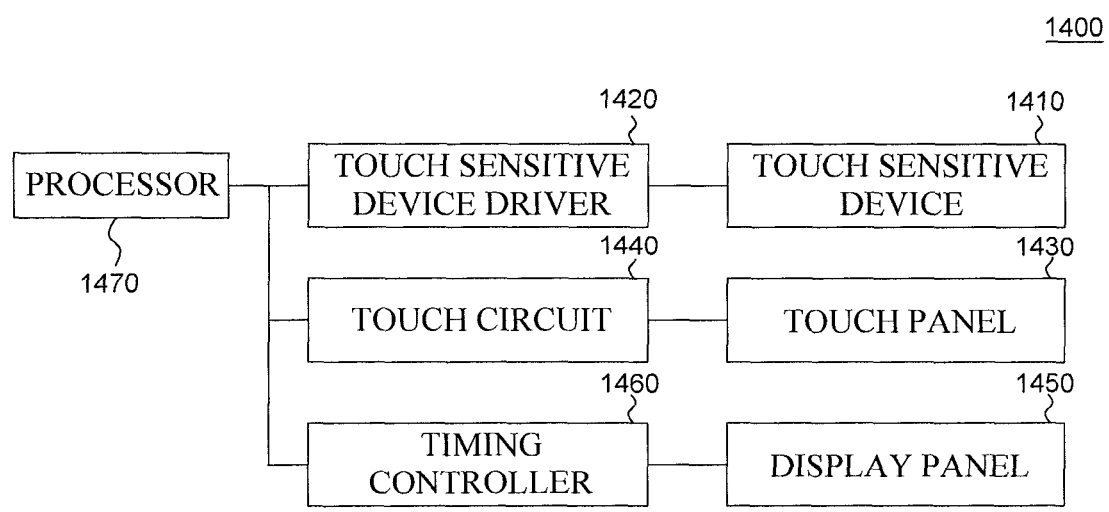
FIG. 14 is a block diagram illustrating a display device according to another embodiment of the present disclosure.
Figure 15:
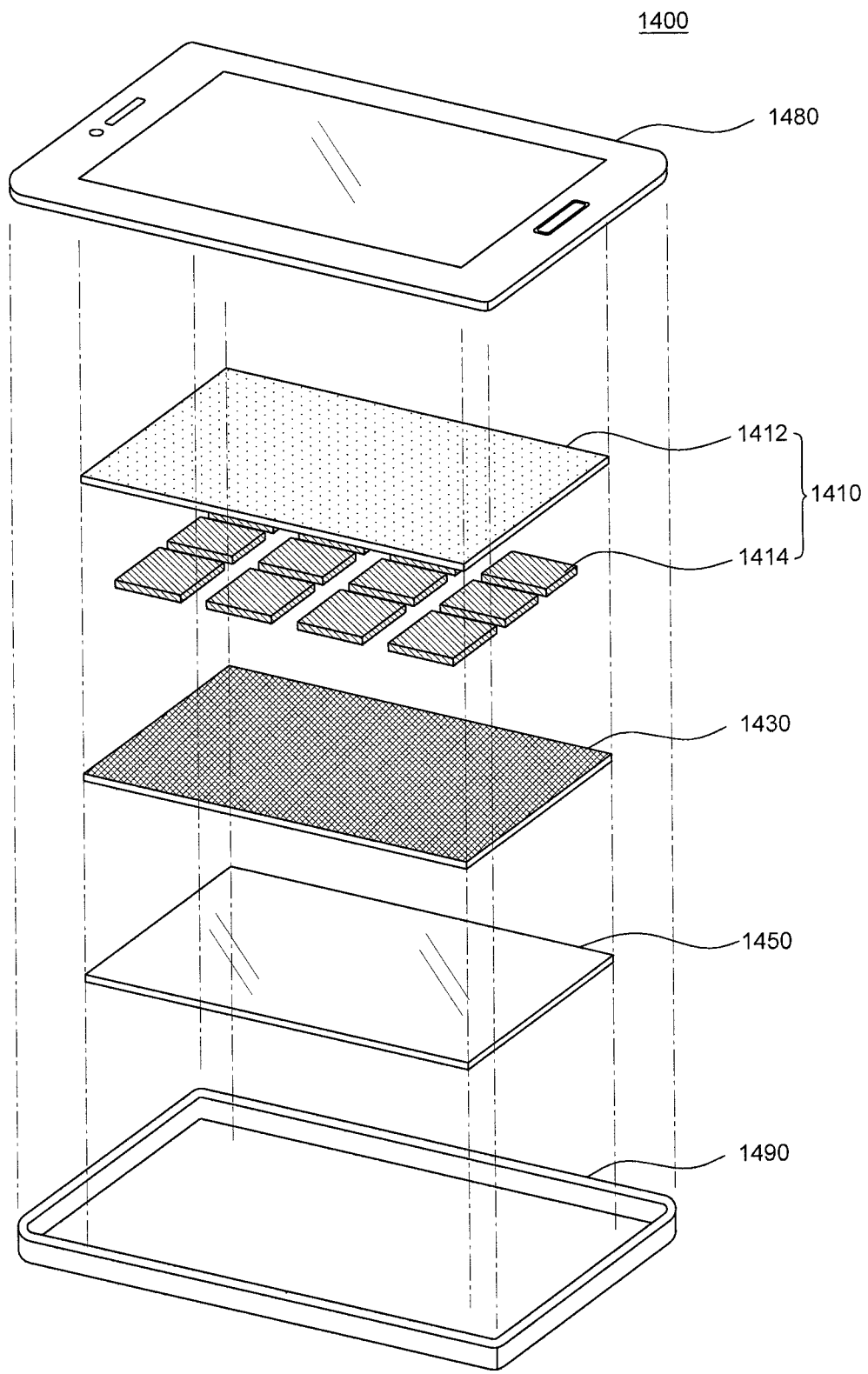
FIG. 15 is an exploded perspective view illustrating a display device according to another embodiment of the present disclosure.

FIG. 14 is a block diagram illustrating a display device according to another embodiment of the present disclosure. FIG. 15 is an exploded perspective view illustrating a display device according to another embodiment of the present disclosure. Referring to FIGS. 14 and 15, a display device 1400 includes a touch sensitive device 1410, a touch sensitive device driver 1420, a touch panel 1430, a touch circuit 1440, a display panel 1450, a timing controller 1460, a processor 1470, an upper cover 1480, and a lower cover 1490. In FIG. 15, the touch sensitive device driver 1420, the touch circuit 1440, the timing controller 1460, and the processor 1470 are not illustrated for brevity.

The touch sensitive device 1410 provides vibration of an electroactive layer 1412 generated by applying a voltage to a plurality of electrodes 1414 on the bottom surface of the electroactive layer 1412 made of an electroactive polymer and texture generated by an electrostatic attractive force between a user's finger and an electrode, and by a friction force due to movement of the finger. The touch sensitive device 1410 is made of transparent materials. The touch sensitive device 1410 can provide a sense of touch and texture in a predetermined area through the electrodes 1414. Referring to FIG. 15, the touch sensitive device 1410 includes the electroactive layer 1412 and the electrodes 1414. The electrodes 1414 are disposed only on the same surface of the electroactive layer 1412. A display device according to another embodiment of the present disclosure may include any one of the touch sensitive devices 100, 400, 500, 600, 800, 900, and 1000 according to various embodiments of the present disclosure described with reference to FIGS. 1A to 10.

The touch sensitive device driver 1420 controls a voltage for driving the touch sensitive device 1410 in response to a received vibration driving signal. The touch sensitive device driver 1420 provides voltages having various magnitudes and frequencies. Further, the touch sensitive device 1410 can generate various electric fields to provide both texture of an object and vibration. Thus, the touch sensitive device driver 1420 may apply different voltages to the electrodes 1414, respectively. The touch sensitive device driver 1420 changes the way of applying a voltage in response to input of the processor 1470 or the touch panel 1430. For example, the touch sensitive device driver 1420 may determine applied voltages to apply to the electrodes 1414 of the touch sensitive device 1410 and transmit the applied voltages to the electrodes 1414. The structure of the touch sensitive device 1410 and the operation of the touch sensitive device driver 1420 are described in detail below with reference to FIGS. 16 to 19.

The upper cover 1480 is disposed on the touch sensitive device 1410. The upper cover 1480 is provided for protecting the display device 1400 from an external shock. The upper cover 1480 may be made of a transparent insulating material such as plastic or glass.

The touch panel 1430 is disposed under the touch sensitive device 1410. The touch circuit 1440 receives a touch input signal from the touch panel 1430 and outputs various touch output signals relating to touches. The touch circuit 1440 can output touch output signals to the touch sensitive device driver 1420 and the processor 1470. However, when the touch panel is a capacitive touch panel, the touch panel 1430 may be disposed on the touch sensitive device 1410 to more easily sense a change in capacitance (e.g., the touch panel can be located between the user and the touch sensitive device 1410).

The display panel 1450 is disposed under the touch panel 1430. As the display panel 1450, various display panels such as an organic light emitting display panel, a liquid display panel, and an electrophoretic display panel can be used, as described above. The display panel 1450 may include a flexible substrate and have flexibility. The display panel having flexibility can be deformed in various directions and at various angles by an external force. The timing controller 1460 drives the display panel 1450, using a scan control signal and a data control signal on the basis of an input image.

The lower cover 1490 is disposed under the display panel 1450 to cover the lower portions of the touch sensitive device 1410, the touch panel 1430, and the display panel 1450. The lower cover 1490 protects the components in the display device 1400 from an external shock and dirt or water. For example, the lower cover 1490 may be made of glass having high hardness or plastic that can be thermally formed and has high machinability, but is not limited thereto. Further, the lower cover 1490 may be made of a material that can deform with changes in flexibility and shape of the touch sensitive device 1410. For example, the lower cover 1490 may be made of plastic having flexibility, but is not limited thereto. In FIG. 15, bonding layers for bonding the touch sensitive device 1410, the touch panel 1430, the display panel 1450, the upper cover 1480, and the lower cover 1490 may be used.

The processor 1470, a component for performing various calculations, may be a control unit such as an MAP (Multimedia Application Processor), an MCU (Microcontroller), and an ISP (Image Signal Processor). The processor 1470 can process images and output a vibration driving signal to the touch sensitive device 1410 in response to a touch output signal from the touch circuit 1440.

Figure 16:
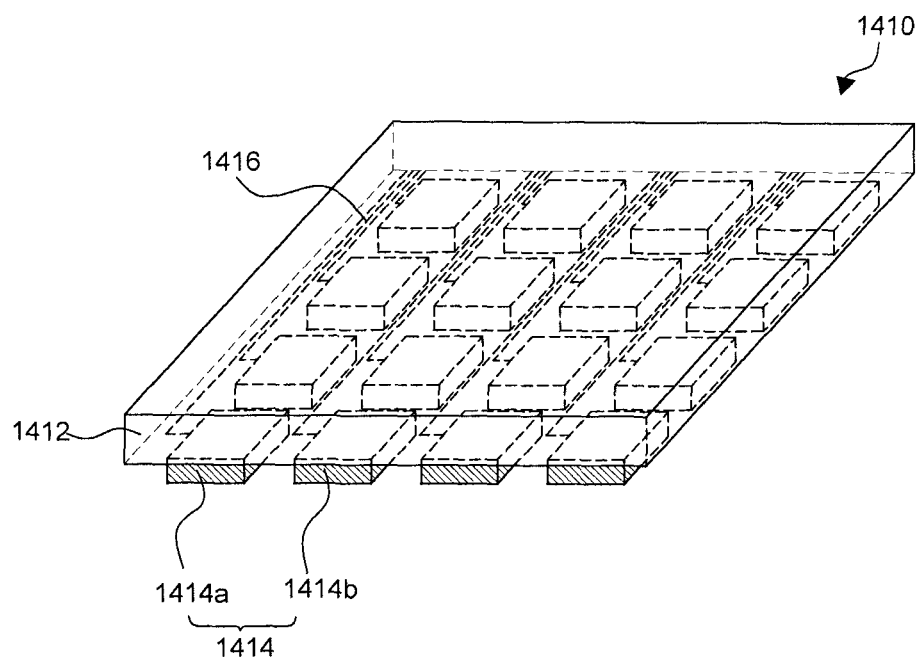
FIG. 16 is a perspective view illustrating a touch sensitive device of a display device according to another embodiment of the present disclosure.

FIG. 16 is a perspective view illustrating a touch sensitive device of a display device according to another embodiment of the present disclosure. Referring to FIG. 16, the touch sensitive device 1410 includes an electroactive layer 1412, a plurality of electrodes 1414, and wires 1416.

The electroactive layer 1412 and the electrodes 1414 are substantially the same as the electroactive layer and the first electrodes and the second electrodes described with reference to FIGS. 1A to 10, thus repetitive explanation is not provided. Referring to FIG. 16, the electrodes 1414 include first electrodes 1414a and second electrodes 1414b. The first electrodes 1414a and the second electrodes 1414b are disposed adjacent to each other on the bottom surface of the electroactive layer 1412. The first electrodes 1414a and the second electrodes 1414b are connected to the wires 1416 extending to a surface of the touch sensitive device 1410, respectively. The wires 1416, for example, are connected to a flexible circuit board through the pad unit at a surface of the touch sensitive device 1410 and the flexible circuit board may be electrically connected with a driving unit of the touch sensitive device 1410.

Figure 17A:
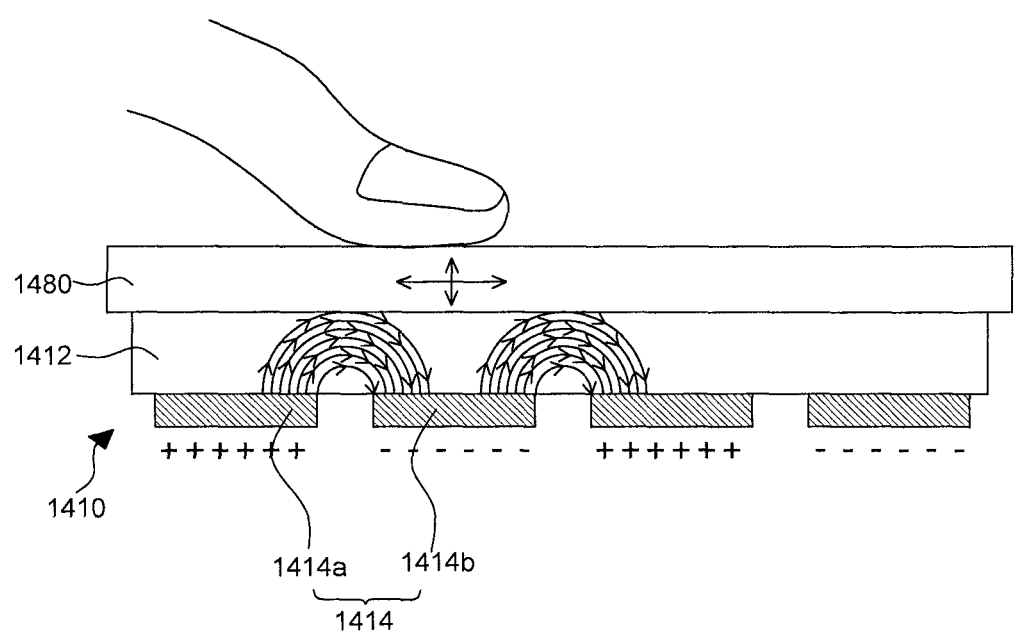
FIGS. 17A and 18A are schematic cross-sectional views illustrating operation of a display device and sense of touch that a user feels according to another embodiment of the present disclosure.
Figure 17B:
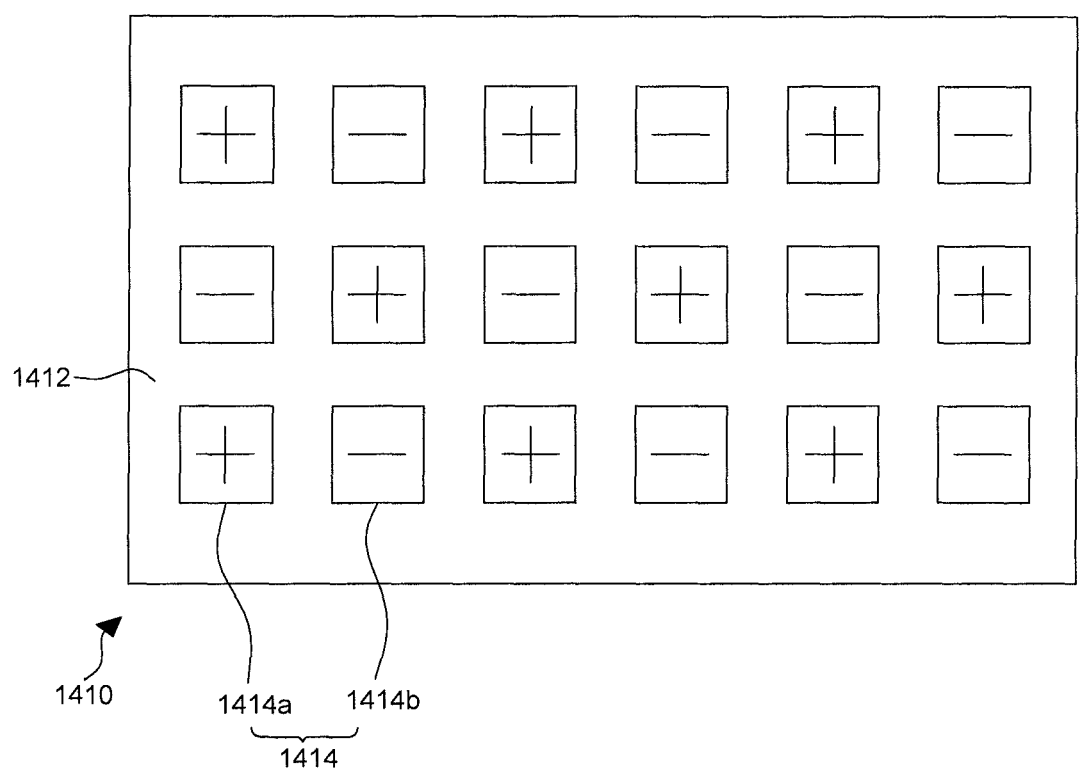
FIGS. 17B and 18B are schematic views illustrating operation of a display device according to another embodiment of the present disclosure.
Figure 17C:
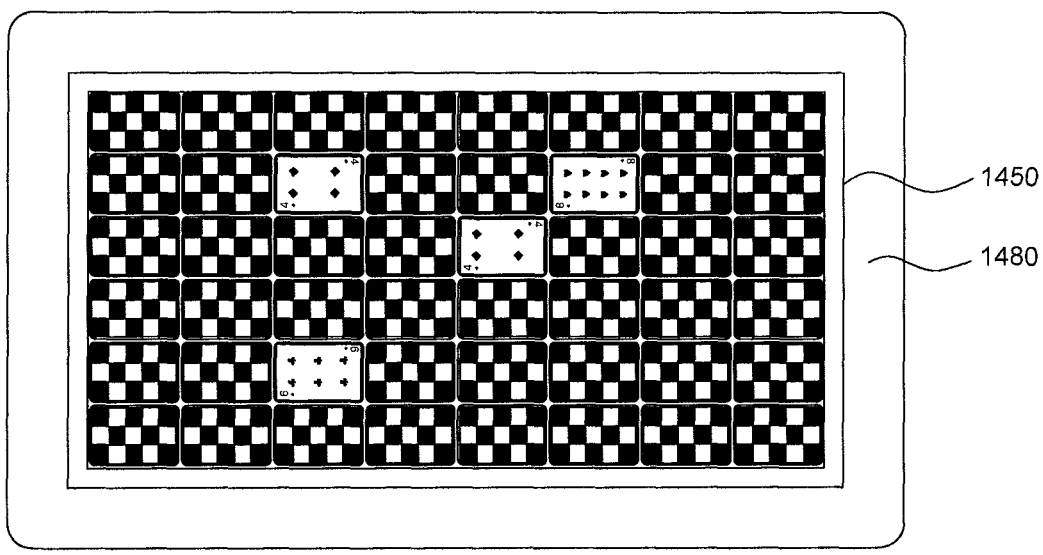
FIGS. 17C and 18C are schematic views illustrating operation of a display device according to another embodiment of the present disclosure.

FIG. 17A is a schematic cross-sectional view illustrating operation of a display device according to another embodiment of the present disclosure and a touch that a user feels. FIG. 17B is a schematic view illustrating operation of a display device according to another embodiment of the present disclosure. FIG. 17C is a schematic view illustrating operation of a display device according to another embodiment of the present disclosure. The touch panel 1430 and the display panel 1450 of the display device 1400 are not illustrated in FIG. 17A for the descriptive convenience. The touch sensitive device 1410 of the display device 1400 illustrated in FIG. 17A is substantially the same as the touch sensitive device 1410 illustrated in FIG. 16, so repetitive description of the structure is not provided. In the figures described below, the symbol "+" represents that a driving voltage is applied to an electrode and the symbol "−" represents that a voltage of 0 V is applied to an electrode or an electrode is grounded.

Referring to FIG. 17A, for example, a first voltage that is a driving voltage is applied to the first electrodes 1414a and a second voltage, for example, of 0 V is applied to the second electrodes 1414b adjacent to the first electrodes 1414a or the second electrodes 1414b are grounded. Accordingly, an electric field is generated in the electroactive layer 1412 between the first electrodes 1414a and the second electrodes 1414b. When the electroactive layer 1412 is made of a dielectric elastomer, the touch sensitive device 1410 is vibrated by contraction and expansion of the dielectric elastomer. Alternatively, when the electroactive layer 1412 is made of a ferroelectric polymer, the electroactive layer 1412 is vibrated by a change of the arrangement direction of dipoles in the electroactive layer 1412. The vibration of the touch sensitive device 1410 is delivered to the upper cover 1480 and a user can feel the vibration through a mechanical stimulation receptor in a finger touched on the upper cover 1480. In other words, only the portion of the touch sensitive device 1410 that is directly under the user's finger can be selectively vibrated. Further, voltages having different frequencies may be applied to provide various vibrations. The frequency of a voltage applied to a plurality of electrodes to provide various vibrations may be, for example, within the range of 1 to 500 Hz.

A first voltage and a second voltage, respectively, or different voltage having a potential may be applied to the electrodes 1414 including the first electrode 1414a and the second electrode 1414b and vibration is generated by a potential difference between adjacent electrodes 1414. FIG. 17B illustrates voltages applied to the electrodes 1414 in the touch sensitive device 1410 of the display device 1400 according to another embodiment of the present disclosure. As in FIG. 17B, a first voltage and a second voltage are alternately applied to the electrodes 1414 of the touch sensitive device 1410, so vibration can be provided to a user (e.g., the entire touch sensitive device 1410 can be vibrated). Further, local vibration may also be provided by applying a voltage only to some of adjacent electrodes of the electrodes 1414 (e.g., only a small portion is selectively vibrated).

FIG. 17C illustrates the display panel 1450 of the display device 1400 according to an embodiment of the present disclosure and an image displayed by the display panel 1450. A plurality of cards are laid in the image, and when a user selects one of the cards with a finger, local vibration is delivered through the finger. Selecting one of the cards is not accompanied by planar movement of the finger, so the display device 1400 delivers sense of touch feedback through vibration by the operation of the touch sensitive device 1410 in FIGS. 17A and 4B.

Further, in the display device 1400 according to another embodiment of the present disclosure, texture of a displayed object, not vibration, can be provided through the touch sensitive device 1410. Texture of an object can be implemented by driving the touch sensitive device 1410 in a different way from that described with reference to FIGS. 17A and 17B. A method of driving the touch sensitive device 1410 for implementing texture of an object is described hereafter.

Figure 18A:
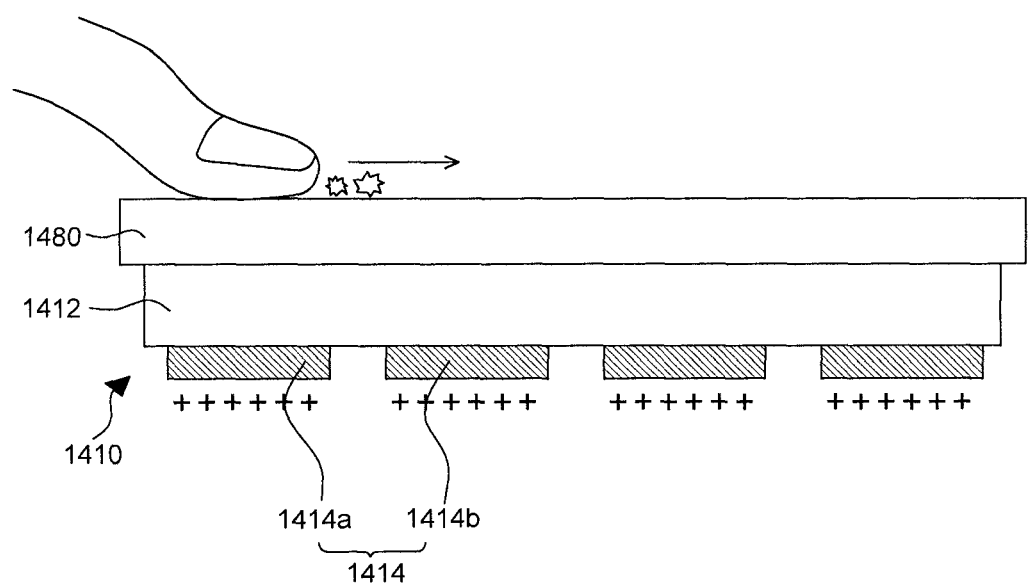
Figure 18B:
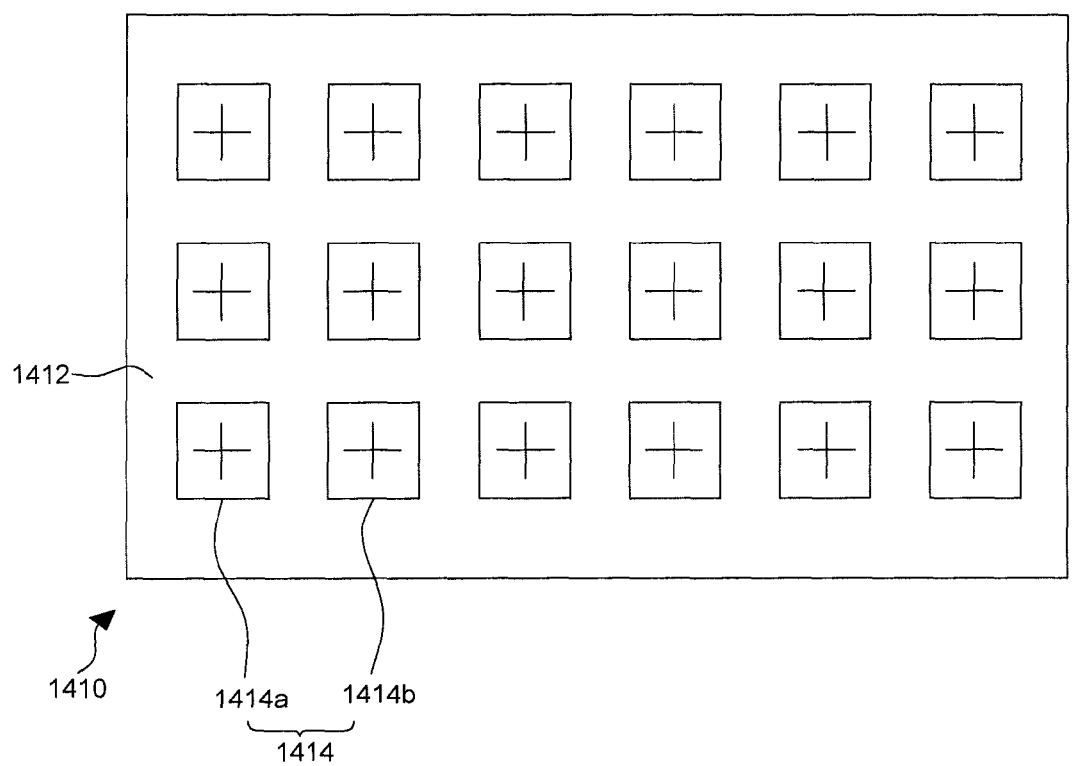
Figure 18C:
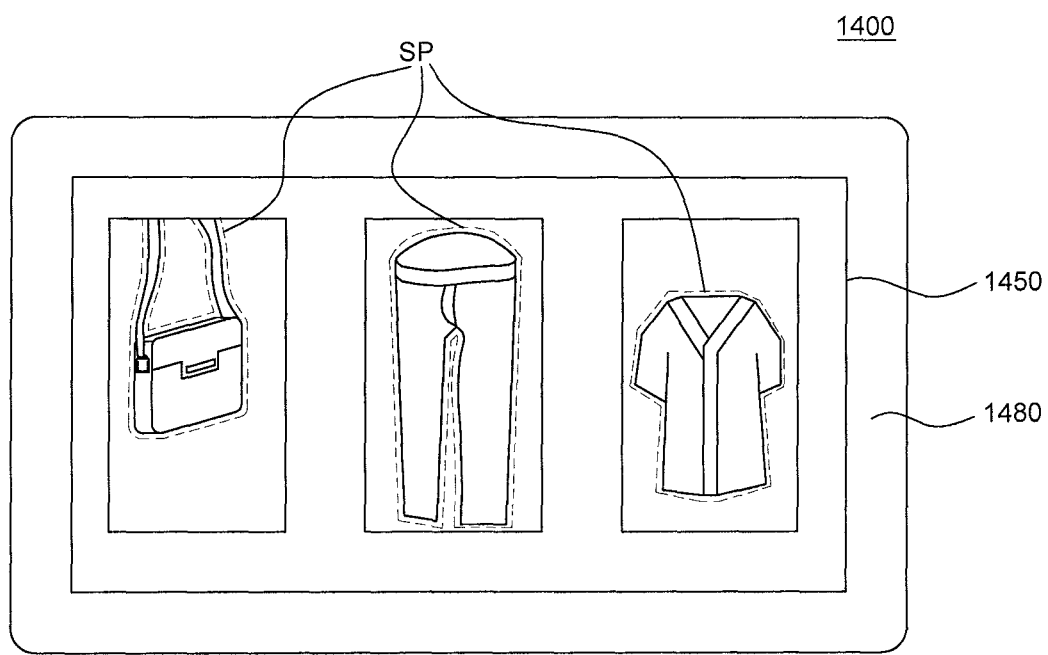

FIG. 18A is a schematic cross-sectional view illustrating operation of a display device according to another embodiment of the present disclosure and a touch that a user feels. FIG. 18B is a schematic view illustrating operation of a display device according to another embodiment of the present disclosure. FIG. 18C is a schematic view illustrating operation of a display device according to another embodiment of the present disclosure. The touch panel 1430 and the display panel 1450 of the display device 1400 are not illustrated in FIG. 18A for the descriptive convenience. The touch sensitive device 1410 of the display device 1400 illustrated in FIG. 18A is substantially the same as the touch sensitive device 1410 illustrated in FIG. 16, so repetitive description of the structure is not provided.

Referring to FIG. 18A, a first voltage is applied to all of the first electrodes 1414a and the second electrodes 1414b. Accordingly, an electric field is generated between the electrodes 1414 and a finger, horizontal friction is generated by planar movement of the finger, and a user can feel texture of materials through friction between the first electrodes 1414a and the second electrodes 1414b.

As described above, a first voltage or a second voltage may be applied to all of the electrodes 1414 including the first electrodes 1414a and the second electrodes 1414b. FIG. 18B illustrates voltages applied to the electrodes 1414 in the touch sensitive device 1410 of the display device 1400 according to another embodiment of the present disclosure. As in FIG. 18B, the first voltage is applied to all of the electrodes 1414 of the touch sensitive device 1410, so texture can be provided to a user when the user moves the finger on the plane. FIG. 18C illustrates the display panel 1450 of the display device 1400 according to another embodiment of the present disclosure and an image displayed by the display panel 1450. Products of an online shopping mall are displayed in the image. A first voltage is applied to the electrodes 1414 corresponding to areas SP in which the products are displayed. Accordingly, when a finger moves on the areas SP where the products are displayed, the texture of the products is delivered through the finger (e.g., the user's finger only sticks to areas displaying the products). Further, voltages having different frequencies are applied to the areas SP where the products are displayed, so various textures such as smoothness or roughness can be provided. The frequency of a voltage applied to the electrodes 1414 to provide textures may be, for example, within the range of 1 to 1000 Hz.

The texture of a product is accompanied by planar movement of a finger without vibration by input, so the display device can deliver sense of touch feedback through operation of the touch sensitive devices 1410 in FIGS. 18A and 18B and texture by horizontal friction of a finger.

Figure 19:
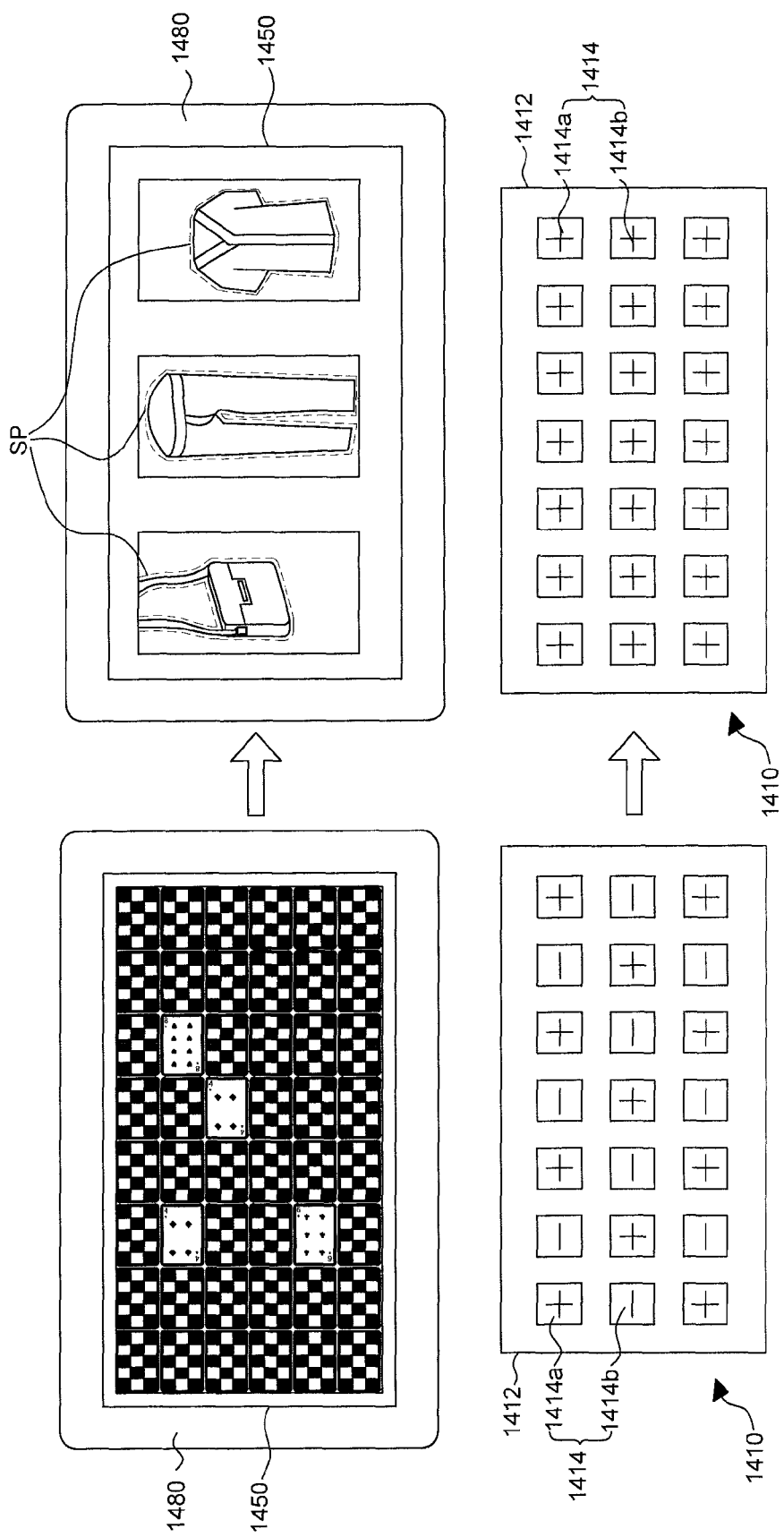
FIG. 19 is a schematic view illustrating operational conversion of a display device according to another embodiment of the present disclosure.

FIG. 19 is a schematic view illustrating operational conversion of a display device according to another embodiment of the present disclosure. Referring to FIG. 19, a plurality of cards is laid in the display panel 1450, in which a first voltage and a second voltage are alternately applied to first electrodes 1414a and second electrodes 1414b, respectively, of plurality of electrodes, in the touch sensitive devices 1410 as in FIG. 17B. When a user selects one of the cards, local vibration is delivered through a finger.

Next, the image on the display panel 1450 changes and products of an online shopping mall are displayed. In this instance, a first voltage is applied to all of the first electrodes 1414a and the second electrodes 1414b of the touch sensitive devices 1410 electrodes 1414 in the touch sensitive device 1410, as in FIG. 18B. Accordingly, when a finger of a user moves on the areas SP where the products are displayed, the texture of the products is delivered through the finger.

That is, by changing the voltage applied to the second electrodes 1414b from the second voltage to the first voltage which is same as the voltage applied to the first electrodes 1414a, an electric field generated by a potential difference is removed, while an electric field is generated between the user's finger and the first and second electrodes 1414a 1414b. Accordingly, in the display device 1400 according to an embodiment of the present disclosure, vibration and texture of an object can be selectively provided, depending on the operation of one touch sensitive device 1410. Further, since it is possible to achieve two different kinds of haptic senses through one touch sensitive device 1410, the manufacturing process can be simplified and the manufacturing cost can be reduced accordingly.

A touch sensitive device of a display device according to another embodiment of the present disclosure was manufactured and its operation was checked. An electroactive polymer film including polydimethyl siloxane and having a thickness of 190 μm and transmissivity of 89% was used for an electroactive layer. A plurality of electrodes was formed by sputtering ITO on the bottom surface of the electroactive layer with surface resistance of 182Ω/□ and a thickness of 900 Å. Next, a sine wave having a voltage between 500 and 1000 V and a frequency of 100 Hz was used as a driving voltage. Vibration was measured in vibration acceleration. As in FIGS. 17A and 17B, when 0 V and the driving voltage were applied to a plurality of adjacent electrodes, the measured vibration acceleration was 0.15 G. As in FIGS. 18A and 18B, when the driving voltage was applied to all of a plurality of adjacent electrodes and a finger was moved, a material by a friction force was felt.

Figure 20:
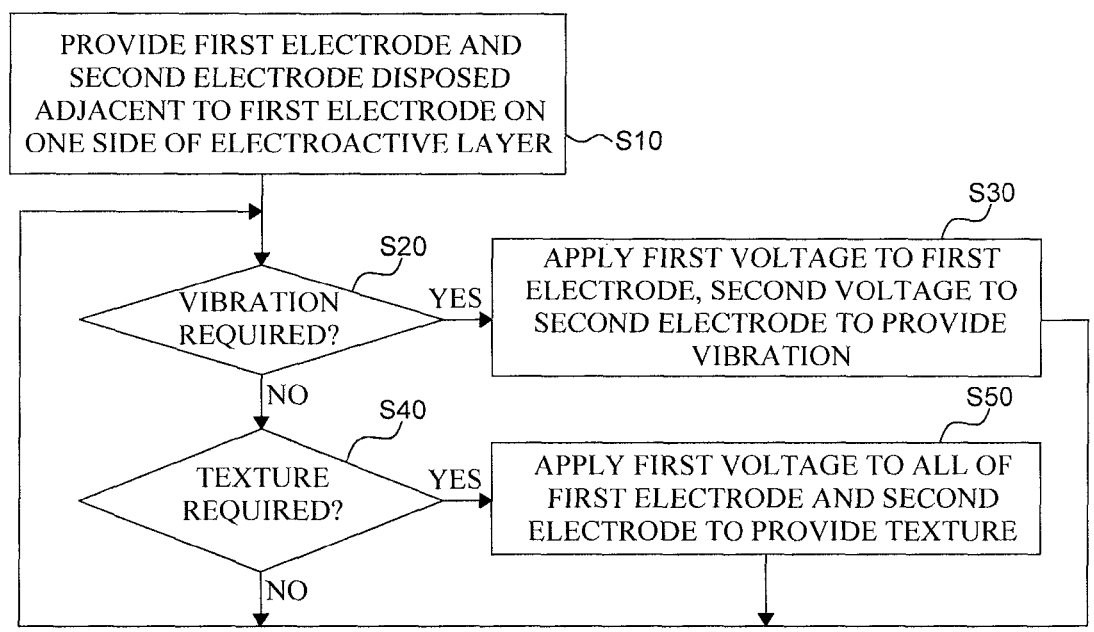
FIG. 20 is a flowchart illustrating a method of driving a display device according to another embodiment of the present disclosure.

FIG. 20 is a flowchart illustrating a method of driving a display device according to another embodiment of the present disclosure. First, first electrodes and second electrodes disposed adjacent to the first electrodes are provided on a surface of an electroactive layer (S10).

Next, it is determined whether vibration is required (S20). For example, when a displayed image is an electronic keyboard requiring vibration, an image receiving a call or a text message, or an image requiring input feedback, vibration may be required. When vibration is required, an actuator of the display device may operate to provide vibration.

In order to provide vibration through the electroactive layer, a first voltage is applied to the first electrodes and a second voltage is applied to the second electrodes so that the touch sensitive device vibrates. For example, a driving voltage may be applied to the first electrodes and the second electrodes may be grounded or supplied with a voltage of 0 V. Accordingly, the electroactive layer contracts and expands, so vibration is provided. After the vibration is provided, the process S20 is repeated.

When it is determined there is no need for vibration, then it is determined whether texture of an object is required (S40). For example, when a displayed image includes an object requiring texture, or a page is scrolled, or electronic writing is performed, texture may be required. When texture is required, the actuator of the display device operates to provide texture.

A first voltage is applied to all of the first electrodes and the second electrodes to generate horizontal friction on the touch sensitive device so that texture is provided. Accordingly, when a finger moves on the display device, electrical horizontal friction is generated and a sense of touch is delivered to the finger. After the texture is provided, the process S20 is repeated. Even if the texture is not required, the process S20 is repeated. However, the method of driving a display device illustrated in FIG. 11 is just an example, and it is not limited thereto as long as a display device can selectively provide vibration and texture. Further, it is possible to determine whether vibration or texture is required through various types of algorithms. The sequential order or method for determination may be different from the example. Further, it is possible to provide local sense of touch or texture to a user by applying a voltage only to a portion of the touch sensitive device.

FIG. 21(a)-(f) are views illustrating actual advantageous examples of using display devices according to various embodiments of the present disclosure.

Figure 21:
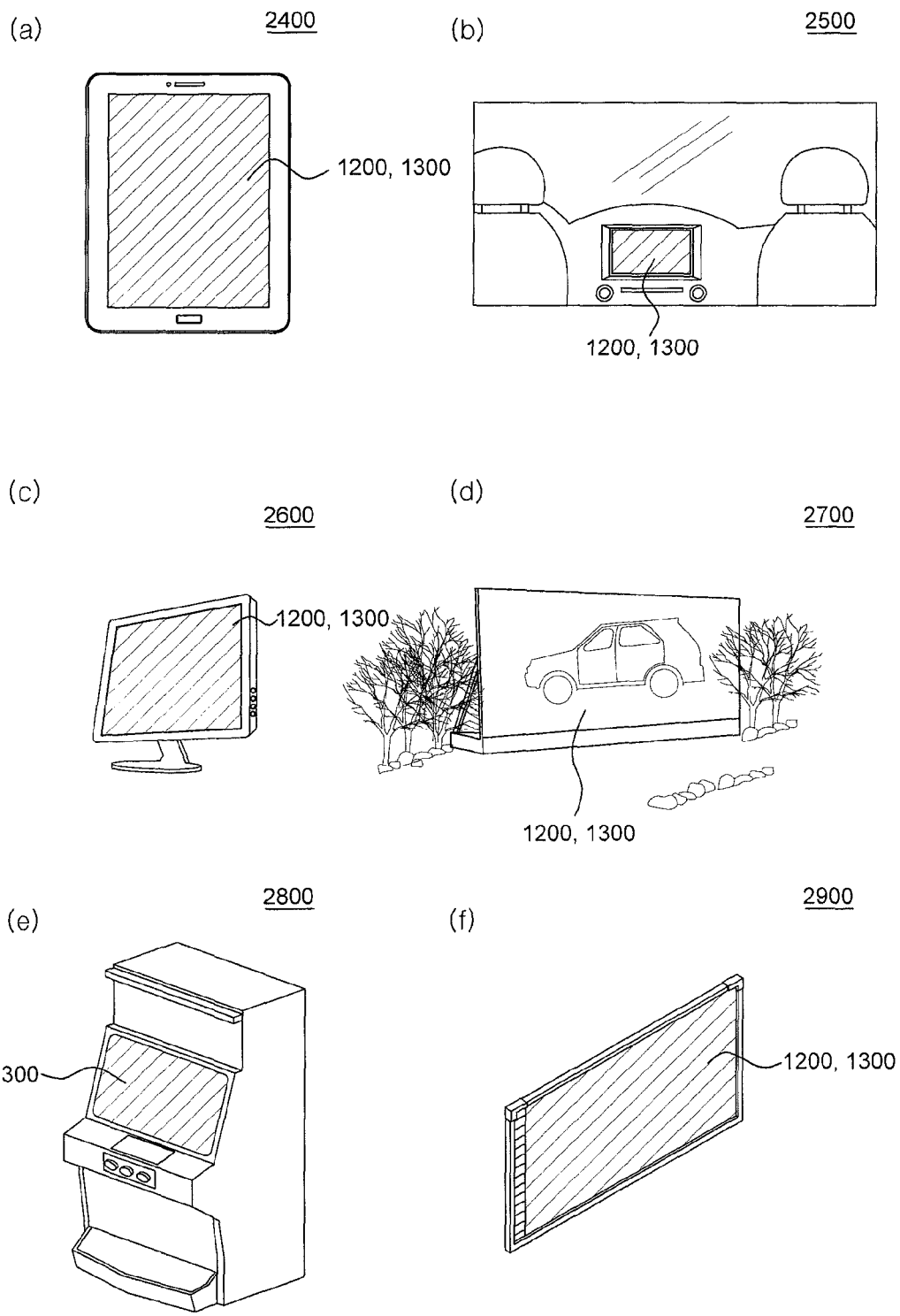
FIG. 21 is a view illustrating actual advantageous examples of using display devices according to various embodiments of the present disclosure.

FIG. 21(a) illustrates a situation of using display devices 1200 and 1300 according to various embodiments of the present disclosure in a mobile device 2400. The display devices 1200 and 1300 according to various embodiments of the present disclosure are included in the mobile device 2400 in FIG. 21(a), in which the mobile device 2400 is a small-sized device such as a smartphone, a mobile phone, a tablet PC, and a PDA. When a display device is mounted on the mobile device 2400, its battery is used without an external power, so the components of the display devices 1200 and 1300 should be designed to be suitable for the limited capacity of the battery. Accordingly, as in the display devices 1200 and 1300 according to various embodiments of the present disclosure, first electrodes and second electrodes are formed on the same plane as an electroactive layer, so a driving voltage of the touch sensitive devices of the display devices 1200 and 1300 is reduced and the display device 1200 and 1300 can be normally operated even with a battery having a limited capacity. Further, a user can feel vibration when touching the mobile device 2400 to watch a video, play a game, press a button, and the like, so he/she can receive more sensitive information and feedback.

FIG. 21(b) illustrates a situation of using display devices 1200 and 1300 according to various embodiments of the present disclosure in an automotive navigation system. The automotive navigation system 2500 may include the display devices 1200 and 1300 and a plurality of operational components and may be controlled by a processor in a vehicle. When the display devices 1200 and 1300 are used for the automotive navigation system 2500, they can provide the degree of height of a road, the state of a road, and the driving state of a vehicle with senses.

FIG. 21(c) illustrates an example of using display devices 1200 and 1300 according to various embodiments of the present disclosure as a display unit 2600 such as a monitor and a TV. When the display devices 1200 and 1300 according to various embodiments of the present disclosure are used as a display unit 2600, a user can feel the material of specific objects and the condition of a talker like a real situation, so he/she can enjoy more real images.

FIG. 21(d) illustrates an example of using display devices 1200 and 1300 according to various embodiments of the present disclosure for an outdoor billboard 2700. The outdoor billboard 2700 may include the display devices 1200 and 1300 and a support for connecting the display devices to the ground. When the display devices 1200 and 1300 according to various embodiments of the present disclosure is applied to the outdoor billboard 2700, the information about a product to be sold can be directly delivered to a user together with a sensitive information image and/or voice, so the advertisement effect can be maximized.

FIG. 21(e) illustrates a case of using display devices 1200 and 1300 according to various embodiments of the present disclosure in a game system 2800. The game system 2800 may include the display devices 1200 and 1300 and a housing receiving various processors. When the display devices 1200 and 1300 according to various embodiments of the present disclosure are applied to the game system 2800, when a user operates the system for playing a game, various sensitive feedbacks can be provided, so the user can further concentrate on the game.

FIG. 21(f) illustrates an example of using display devices 1200 and 1300 according to various embodiments of the present disclosure for an electronic blackboard 2900. The electronic blackboard 2900 may include the display devices 1200 and 1300, a speaker, and a structure for protecting them from an external shock. When the display devices 1200 and 1300 according to various embodiments of the present disclosure are used in the electronic blackboard 2900, an educator can feel like he or she is writing directly on a blackboard when inputting the matters to communicate on the display devices 1200 and 1300 with a stylus pen or a finger. Further, as a student touches an image displayed on the electronic blackboard 2900, sensitive feedback suitable for the image can be provided to the student, so the educational effect can be maximized.

Although the embodiments of the present disclosure have been described in detail with reference to the accompanying drawings, the present disclosure is not limited thereto and may be embodied in many different forms without departing from the technical concept of the present disclosure. Accordingly, the embodiment described herein are provided not to limit, but to explain the spirit of the present disclosure and the spirit and the scope of the present disclosure are not limited by the embodiments. The protective range of the present disclosure should be construed on the basis of claims and all the technical spirits in the equivalent range should be construed as being included in the scope of the right of the present disclosure.

What is claimed is:

1. A touch sensitive device comprising:
   an electroactive layer including an electroactive polymer; and
   a plurality of first electrodes and a plurality of second electrodes on the electroactive layer, each of the plurality of first electrodes and the plurality of second electrodes in contact with a same surface of the electroactive layer,
   wherein the plurality of first electrodes and the plurality of second electrodes include a conductive material,
   wherein the electroactive layer includes a plurality of cells, and the plurality of first electrodes and the plurality of second electrodes are disposed in each cell of the plurality of cells,
   wherein the plurality of first electrodes have a first portion spaced by a first gap from the plurality of second electrodes disposed in a same cell and the plurality of first electrodes have a second portion spaced by a second gap from the plurality of second electrodes in the same cell, and wherein the first gap is a different distance than the second gap.

2. The touch sensitive device of claim 1, wherein each of the plurality of first electrodes and the plurality of second electrodes have a first sub-electrode and a plurality of second sub-electrodes extending from the first sub-electrode, and wherein the plurality of second sub-electrodes of the plurality of first electrodes and the plurality of second sub-electrodes of the plurality of second electrodes are alternately disposed.

3. The touch sensitive device of claim 1, wherein a gap between the plurality of first electrodes and the plurality of second electrodes is smaller than a thickness of the electroactive layer.

4. The touch sensitive device of claim 1, wherein each of the plurality of first electrodes and the plurality of second electrodes have a spiral structure or a double loop structure.

5. The touch sensitive device of claim 1, wherein the plurality of first electrodes and the plurality of second electrodes include a transparent conductive material.

6. The touch sensitive device of claim 1, wherein the electroactive layer is configured to vibrate due to an electric field generated on the electroactive layer when a voltage is applied to the plurality of first electrodes and the plurality of second electrodes.

7. A touch sensitive device, comprising:
a plurality of first electrodes in a plurality of cells, the plurality of first electrodes in contact with a surface of an electroactive layer including an electroactive polymer, wherein a first voltage is applied to the plurality of first electrodes; and
a plurality of second electrodes in the plurality of cells, the plurality of second electrodes in contact with the surface of the electroactive layer including an electroactive polymer and including a conductive material, wherein a second voltage is applied to the plurality of second electrodes,
wherein the first voltage and the second voltage have frequencies corresponding to a resonance frequency according to a gap between the plurality of first and the plurality of second electrodes,
wherein the plurality of first electrodes have a first portion spaced apart by a first gap from the plurality of second electrodes disposed in a same cell and the plurality of first electrodes have a second portion spaced apart by a second gap from the plurality of second electrodes in the same cell, and
wherein the first gap is a different distance than the second gap.

8. The touch sensitive device of claim 7, wherein the first voltage having the resonance frequency is applied to the plurality of first electrodes, and
wherein the plurality of second electrodes are grounded.

9. The touch sensitive device of claim 7,
wherein the first voltage having a resonance frequency corresponding to the first gap or a resonance frequency corresponding to the second gap is applied to the plurality of first electrodes, and
wherein the plurality of second electrodes are grounded.

10. A display device comprising:
a touch panel;
a touch sensitive device including an electroactive layer disposed on or under the touch panel, a plurality of first electrodes and a plurality of second electrodes in contact with only one surface of the electroactive layer; and
a cover disposed over the touch panel and the touch sensitive device,
wherein the plurality of first electrodes and the plurality of second electrodes include a conductive material and the electroactive layer includes an electroactive polymer,
wherein the electroactive layer includes a plurality of cells, and the plurality of first electrodes and the plurality of second electrodes are disposed in each cell of the plurality of cells,
wherein the plurality of first electrodes have a first portion spaced by a first gap from the plurality of second electrodes disposed in a same cell and the plurality of first electrodes have a second portion spaced by a second gap from the plurality of second electrodes in the same cell, and
wherein the first gap is a different distance than the second gap.

11. The display device of claim 10, further comprising a display panel,
wherein the plurality of first electrodes and the plurality of second electrodes face the display panel.

12. The display device of claim 10, further comprising a display panel having the touch panel therein,
wherein the display panel is disposed between the cover and the touch sensitive device or under the touch sensitive device.

13. The display device of claim 10, wherein an area of cells of the touch sensitive device and an area of pixels of the touch panel are the same.

14. A method of driving a touch sensitive device, comprising:
applying different voltages to first electrodes and second electrodes included in a touch sensitive device including an electroactive layer having an electroactive polymer so that the touch sensitive device vibrates; and
applying a same voltage to all of the first electrodes and the second electrodes to generate horizontal friction on the touch sensitive device,
wherein the first electrodes and the second electrodes are in contact with only one surface of the electroactive layer, and the second electrodes are disposed adjacent to the first electrodes,
wherein the electroactive layer includes a plurality of cells, and the first and second electrodes are disposed in each cell of the plurality of cells,
wherein the first electrodes have a first portion spaced by a first gap from the second electrodes disposed in a same cell and the first electrodes have a second portion spaced by a second gap from the second electrodes in the same cell, and
wherein the first gap is a different distance than the second gap.

15. The method of claim 14, wherein the touch sensitive device is configured to generate the horizontal friction based on planar movement of a finger on the touch sensitive device.

16. The method of claim 14, wherein the applying of different voltages to the first electrodes and the second electrodes or the applying of the same voltage to all of the first electrodes and the second electrodes is performed only on a partial area of the touch sensitive device.

17. The touch sensitive device of claim 1, wherein the second gap is at least twice as large as the first gap.

18. The method of claim 14, wherein the second gap is at least twice as large as the first gap.

* * * * *